(12) United States Patent
Kim et al.

(10) Patent No.: US 11,971,206 B2
(45) Date of Patent: Apr. 30, 2024

(54) PANEL ASSEMBLY, REFRIGERATOR, AND HOME APPLIANCES

(71) Applicant: LG Electronics Inc., Seoul (KR)

(72) Inventors: Soyoon Kim, Seoul (KR); Eunsoo Yang, Seoul (KR); Joonghan Son, Seoul (KR); Sangho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/094,109

(22) Filed: Jan. 6, 2023

(65) Prior Publication Data
US 2023/0144762 A1 May 11, 2023

Related U.S. Application Data

(63) Continuation of application No. 17/057,518, filed as application No. PCT/KR2019/014417 on Oct. 30, 2019, now Pat. No. 11,609,038.
(Continued)

(51) Int. Cl.
*F25D 23/02* (2006.01)
*F25D 23/04* (2006.01)
*F25D 27/00* (2006.01)

(52) U.S. Cl.
CPC ........... *F25D 23/028* (2013.01); *F25D 23/04* (2013.01); *E05Y 2900/31* (2013.01); *F25D 27/00* (2013.01);
(Continued)

(58) Field of Classification Search
CPC ........ F25D 23/028; F25D 23/04; F25D 27/00; F25D 2323/023; F25D 2400/36;
(Continued)

(56) References Cited

U.S. PATENT DOCUMENTS 4,998,382 A * 3/1991 Kostos ................. E06B 3/6617
49/504
10,039,390 B2 * 8/2018 Artwohl ............ B32B 17/10174
(Continued)

FOREIGN PATENT DOCUMENTS

CN 1126504 7/1996
CN 1128320 8/1996
(Continued)

OTHER PUBLICATIONS

Extended European Search Report in European Appln. No. 19881634.0, dated Jul. 13, 2022, 7 pages.
(Continued)

*Primary Examiner* — Hanh V Tran
(74) *Attorney, Agent, or Firm* — Fish & Richardson P.C.

(57) ABSTRACT

A home appliance includes a refrigerator including a panel assembly. The panel assembly includes: a first panel formed of a glass material; a second panel spaced apart from the first panel and formed of a glass material; a plurality of spacers provided between the first panel and the second panel so as to maintain a gap between the first panel and the second panel, and arranged to be spaced apart from each other; a sealing member disposed between the first panel and the second panel for sealing a space between the first panel and the second panel; an exhaust hole provided in at least one of the first panel and the second panel so as to discharge air such that the space between the first panel and the second panel becomes a vacuum insulation space; and a cover member covering the exhaust hole.

19 Claims, 33 Drawing Sheets

Related U.S. Application Data

(60) Provisional application No. 62/757,721, filed on Nov. 8, 2018.

(52) U.S. Cl.
CPC .... *F25D 2323/023* (2013.01); *F25D 2400/36* (2013.01)

(58) Field of Classification Search
CPC .............. F25D 23/025; F25D 2400/40; F25D 2700/02; F25D 2700/04; F25D 23/02; F25D 23/065; F25D 23/087; E05Y 2900/31; D06F 39/14; D06F 58/10; D06F 73/02; E06B 3/58; E06B 3/6612; E06B 3/6617; E06B 3/66304; E06B 3/66357; E06B 2003/66338; F24C 15/04; Y02A 30/249; Y02B 80/22
See application file for complete search history.

(56) References Cited

U.S. PATENT DOCUMENTS

| | | | | |
|---|---|---|---|---|
| 10,088,225 | B2* | 10/2018 | Kim | G01D 5/02 |
| 10,676,981 | B2* | 6/2020 | Yang | E06B 3/673 |
| 10,704,320 | B2* | 7/2020 | Sønderkær | C03C 27/06 |
| 10,988,972 | B2* | 4/2021 | Fujino | C03C 27/06 |
| 11,465,938 | B2* | 10/2022 | Ishibashi | E06B 3/66357 |
| 2004/0035086 | A1* | 2/2004 | Minaai | E06B 3/6617 52/786.13 |
| 2006/0175767 | A1* | 8/2006 | Collins | E06B 3/6612 277/653 |
| 2010/0279038 | A1* | 11/2010 | Wang | E06B 3/66357 428/156 |
| 2016/0061514 | A1* | 3/2016 | Seo | F21V 33/0044 312/405 |
| 2016/0174734 | A1* | 6/2016 | Artwohl | E06B 3/6612 428/34 |
| 2016/0297706 | A1 | 10/2016 | Naito et al. | |
| 2017/0188721 | A1* | 7/2017 | Park | F25D 27/00 |
| 2017/0191744 | A1* | 7/2017 | Koo | F25D 27/005 |
| 2017/0211871 | A1 | 7/2017 | Herrera et al. | |
| 2017/0211874 | A1* | 7/2017 | Kim | F25D 27/005 |
| 2017/0328124 | A1* | 11/2017 | Abe | E06B 3/66304 |
| 2018/0094475 | A1* | 4/2018 | Naito | C03C 8/14 |
| 2018/0164022 | A1* | 6/2018 | Ding | F25D 23/028 |
| 2018/0164025 | A1* | 6/2018 | Lv | A47F 3/0434 |
| 2018/0164026 | A1* | 6/2018 | Lee | A47F 3/0434 |
| 2018/0238486 | A1* | 8/2018 | Jung | F25D 23/062 |
| 2020/0024189 | A1* | 1/2020 | Abe | E06B 3/66304 |
| 2020/0123040 | A1* | 4/2020 | Lian | E06B 3/6775 |
| 2021/0115729 | A1* | 4/2021 | Ishibashi | E06B 3/677 |
| 2021/0381302 | A1* | 12/2021 | Hasegawa | E06B 3/6621 |

FOREIGN PATENT DOCUMENTS

| | | | | |
|---|---|---|---|---|
| CN | 1268990 | 10/2000 | | |
| CN | 102858710 | 1/2013 | | |
| CN | 105143798 | 12/2015 | | |
| CN | 106068431 | 11/2016 | | |
| CN | 106724903 A | 5/2017 | | |
| CN | 106949689 A | 7/2017 | | |
| CN | 107076504 | 8/2017 | | |
| CN | 207742867 U | 8/2018 | | |
| EP | 3168557 | 5/2017 | | |
| JP | 2003-192399 | 7/2003 | | |
| KR | 20130027101 | 3/2013 | | |
| KR | 20160045545 | 4/2016 | | |
| KR | 20170091867 | 8/2017 | | |
| KR | 101841672 | 3/2018 | | |
| KR | 20180067363 | 6/2018 | | |
| WO | WO 2017/010828 | 1/2017 | | |
| WO | WO 2017/010849 | 1/2017 | | |
| WO | WO-2017010828 A1 * | 1/2017 | | F25B 11/00 |
| WO | WO-2017010849 A1 * | 1/2017 | | A47F 3/0434 |
| WO | WO 2017/034332 | 3/2017 | | |
| WO | WO-2017034332 A1 * | 3/2017 | | F21V 23/0471 |
| WO | WO 2017/119614 | 7/2017 | | |
| WO | WO-2017119614 A1 * | 7/2017 | | F25D 23/028 |
| WO | WO 2017/151785 | 9/2017 | | |

OTHER PUBLICATIONS

International Search Report and Written Opinion in International Appln. No. PCT/KR2019/014417, dated Feb. 20, 2020, 9 pages (with English translation).

Office Action in Chinese Appln. No. 201980039883.8, dated May 6, 2022, 15 pages (with English translation).

Office Action in Chinese Appln. No. 201980039883.8, dated Oct. 9, 2021, 18 pages (with English translation).

Office Action in Chinese Appln. No. 201980039883.8, dated Sep. 30, 2022, 15 pages (with Machine Translation).

* cited by examiner (a)

(b)

PANEL ASSEMBLY, REFRIGERATOR, AND HOME APPLIANCES

CROSS-REFERENCE TO RELATED APPLICATIONS

This application is a continuation of U.S. application Ser. No. 17/057,518, filed on Nov. 20, 2020, which is a National Stage application under 35 U.S.C. § 371 of International Application No. PCT/KR2019/014417, filed on Oct. 30, 2019, which claims the benefit of U.S. Provisional Application No. 62/757,721, filed on Nov. 8, 2018. The disclosures of the prior applications are incorporated by reference in their entirety.

TECHNICAL FIELD

The present specification relates to a panel assembly, a refrigerator including the same, and home appliances.

BACKGROUND

In general, refrigerators are home appliances for storing food at a low temperature in a storage space that is covered by a door.

For this, refrigerators cool the inside of the storage space by using cool air generated by being heat-exchanged with a refrigerant circulated through a refrigeration cycle to store foods in an optimum state.

Such a refrigerator is becoming larger and multifunctioned as dietary changes and user's preferences become more diverse, and thus, a refrigerator having various structures and convenience devices for user's convenience and freshness of stored foods has been introduced.

The storage space of the refrigerator may be opened/closed by the door. The refrigerators may be classified into various types according to an arranged configuration of the storage space and a structure of the door that opens and closes the storage space.

A separate accommodation space accessible from the outside may be provided in the door of the refrigerator. The accommodation space may be accessed by opening a partial auxiliary door or a home bar door without opening the entire refrigerator door through the above-described accommodation space.

Thus, frequently used foods may be stored in the separate accommodation space provided in the refrigerator door. Since the entire refrigerator door is not opened for accommodating food, there is an advantage of minimizing leakage of cold air inside the refrigerator.

However, even in such a structure, there is a problem in that the food is not checked unless the refrigerator door is opened. That is, the door should be opened to identify whether desired food is received in a space in the refrigerator or in a separate storage space provided in the door. If there is no desired food when opening the auxiliary door or the home bar, there is inconvenience to open the main door again. Here, there is a problem that unnecessary leakage of cold air occurs.

As a document for solving this problem, there is Korean Patent Publication No. 10-2016-0045545.

In the prior art document, disclosed is a refrigerator including: a cabinet in which a storage space is provided; a lighting device that illuminates the inside of the storage space; a door rotatably provided on the cabinet to open and close the storage space, defining an opening, and including a panel assembly having a front panel disposed on a front surface; and a controller allowing the lighting device to operate so that light is transmitted through the panel assembly so as to allow the storage space to be viewed from the outside of the door through the opening.

The front panel is made of a transparent material, and an insulation panel is disposed on a rear surface of the front panel.

According to the prior art document, when the lighting device is turned on, the light irradiated by the lighting device passes through the front panel made of the transparent material, and thus, a user may see the storage space through the front panel.

In the case of the prior art document, a vacuum space is defined between the front panel and the insulation panel, and a spacer is arranged between the front panel and the insulation panel.

In the case of the prior art document, a technique in which the spacer supports the insulation panel to prevent a central portion of the insulation panel from being bent is disclosed, but a technique of maintaining a constant gap across the front panel and the insulation panel by the spacer is not disclosed.

Also, in the case of the prior art document, when the lighting device is turned on, the light irradiated by the lighting device passes through the insulation panel and the front panel in sequence. However, since the spacer is disposed between the insulation panel and the front panel, there is a problem that the spacer between the insulation panel and the front panel is visible from the outside, and also, the prior art document does not disclose a technique for solving this problem.

Also, in the case of the prior art document, a hole for defining the vacuum space between the front panel and the insulation panel and a stopper for blocking the hole are disclosed. However, while the light irradiated by the lighting device sequentially passes through the insulation panel and the front panel, there is a concern that the hole and the stopper are exposed to the outside, and also, the prior art document does not disclose a technique for solving this problem.

Also, when a size of the spacer increases, possibility in which the gap between the front panel and the insulation panel is uniformly maintained is high. On the other hand, an area through which the light passes through the front panel is reduced by the spacer to reduce visibility.

According to the prior art document as described above, a technique for improving the visibility is not disclosed even if the gap between the front panel and the insulation panel is uniformly maintained.

SUMMARY

The embodiments provide a panel assembly, which is capable of being reduced in thickness while maintaining and improving thermal insulation performance and in which a gap between two panels adjacent to each other is uniformly maintained, a refrigerator, and home appliances.

The embodiments provide a refrigerator including a panel assembly, in which visibility of an inner space from the outside is improved by transmission of light while uniformly maintaining a gap between two panels, and home appliances.

A panel assembly according to one aspect includes: a first panel made of a glass material; a second panel spaced apart from the first panel and made of a glass material; a plurality of spacers provided between the first panel and the second panel so as to maintain a gap between the first panel and the second panel; a sealing member disposed between the first panel and the second panel for sealing a space between the first panel and the second panel; an exhaust hole provided in at least one of the first panel and the second panel so as to discharge air so that the space between the first panel and the second panel becomes a vacuum insulation space; and a cover member covering the exhaust hole.

The plurality of spacers may be spaced apart from each other in a first direction and a second direction crossing the first direction. The plurality of spacers may be disposed to be spaced apart from each other at a predetermined pitch in the first direction and the second direction.

The first panel may include a first area through which light is transmitted and a second area disposed outside the first area to restrict light transmission. A printed layer may be provided on a surface of the first panel facing the second panel, and the first area and the second area may be divided by the printed layer. The second area may be disposed to surround the first area.

The exhaust hole and the sealing member may be disposed to correspond to the second area. The exhaust hole and the sealing member may be disposed to face the second area. The first panel may have a size greater than that of the second panel.

The exhaust hole may be provided in the second panel. A getter for absorbing moisture may be provided in the exhaust hole. Alternatively, a getter for absorbing moisture may be provided at a position adjacent to the exhaust hole in the second panel.

The panel assembly may further include a third panel disposed at a side opposite to the second panel with respect to the first panel. The third panel may have a size greater than that of each of the first panel and the second panel.

The third panel may include a first area through which light is transmitted and a second area disposed outside the first area to restrict light transmission. The exhaust hole and the sealing member may be disposed to correspond to the second area.

An additional spacer may be provided between the third panel and the first panel. The additional spacer may be aligned with the spacer between the first panel and the second panel. The additional spacer may be disposed to face the spacer between the first panel and the second panel.

A gap between the third panel and the first panel may be less than a thickness of the first panel or a thickness of the third panel.

A contact area between the plurality of spacers and the first panel or a contact area between the plurality of spacers and the second panel may correspond to 0.01% to 0.05% of an area of the first panel or the second panel.

The sealing member may include a first portion disposed between the first panel and the second panel and a second portion disposed outside the first portion and having a thickness greater than that of the first portion. The sealing member may further include a third portion disposed outside the second portion to contact a side surface of the second panel.

A refrigerator according to another aspect includes: a cabinet provided with a storage space; and a door configured to open and close the storage space, the door being provided with a panel assembly.

The door may include a frame having an opening, and the panel assembly may be disposed to cover the opening.

The panel assembly may include: a first panel made of a glass material; a second panel spaced apart from the first panel, the second panel being made of a glass material; and a plurality of spacers disposed between the first panel and the second panel to maintain a gap between the first panel and the second panel, the plurality of spacers being disposed to be spaced apart from each other in a first direction and a second direction crossing the first direction.

The panel assembly may include: a sealing member disposed between the first panel and the second panel to seal a space between the first panel and the second panel; an exhaust hole provided in at least one of the first panel or the second panel to exhaust air so that the space between the first panel and the second panel serves as a vacuum insulation space; and a cover member configured to cover the exhaust hole. An insulation material may be provided in the frame and in contact with the second panel.

The first panel may include a first area through which light is transmitted and a second area disposed outside the first area to restrict light transmission. The exhaust hole and the sealing member may be disposed to correspond to the second area. At least a portion of the insulation material may be disposed to face the second area.

The refrigerator may further include a knock sensing device configured to contact the first panel and sense a knock input applied to the first panel.

The panel assembly may further include a third panel disposed at a side opposite to the second panel with respect to the first panel, wherein the third panel has a size greater than that of each of the first panel and the second panel.

The refrigerator may further include a knock sensing device configured to contact the third panel and sense a knock input applied to the third panel.

The refrigerator may further include a lighting unit provided in the door and configured to irradiate light. When a normal knock input is sensed by the knock sensing device, the lighting unit may be turned on while the door is closed to irradiate the light. The light may pass through the panel assembly.

A contact area between the plurality of spacers and the first panel or a contact area between the plurality of spacers and the second panel may correspond to 0.01% to 0.05% of an area of the first panel or the second panel.

The sealing member may include a first portion disposed between the first panel and the second panel and a second portion disposed outside the first portion and having a thickness greater than that of the first portion. The sealing member may further include a third portion disposed outside the second portion to contact a side surface of the second panel.

A home appliance according to further another aspect includes: a cabinet provided with an inner space; and a door configured to open and close the inner space, the door being provided with a panel assembly.

The door may include a frame having an opening, and the panel assembly may be disposed to cover the opening.

According to the proposed invention, there may be the advantage in that the thickness of the panel assembly is reduced while the insulation performance is maintained or increases.

Also, there may be the advantage in that the gap between the two adjacent panels is uniformly maintained during the assembly process or the use process of the panel assembly, and the possibility of damage due to the external force may be reduced.

Also, according to the present invention, the visibility of the inner space from the outside may be improved by light transmission while the gap between the two panels is uniformly maintained.

DETAILED DESCRIPTION

Figure 1:
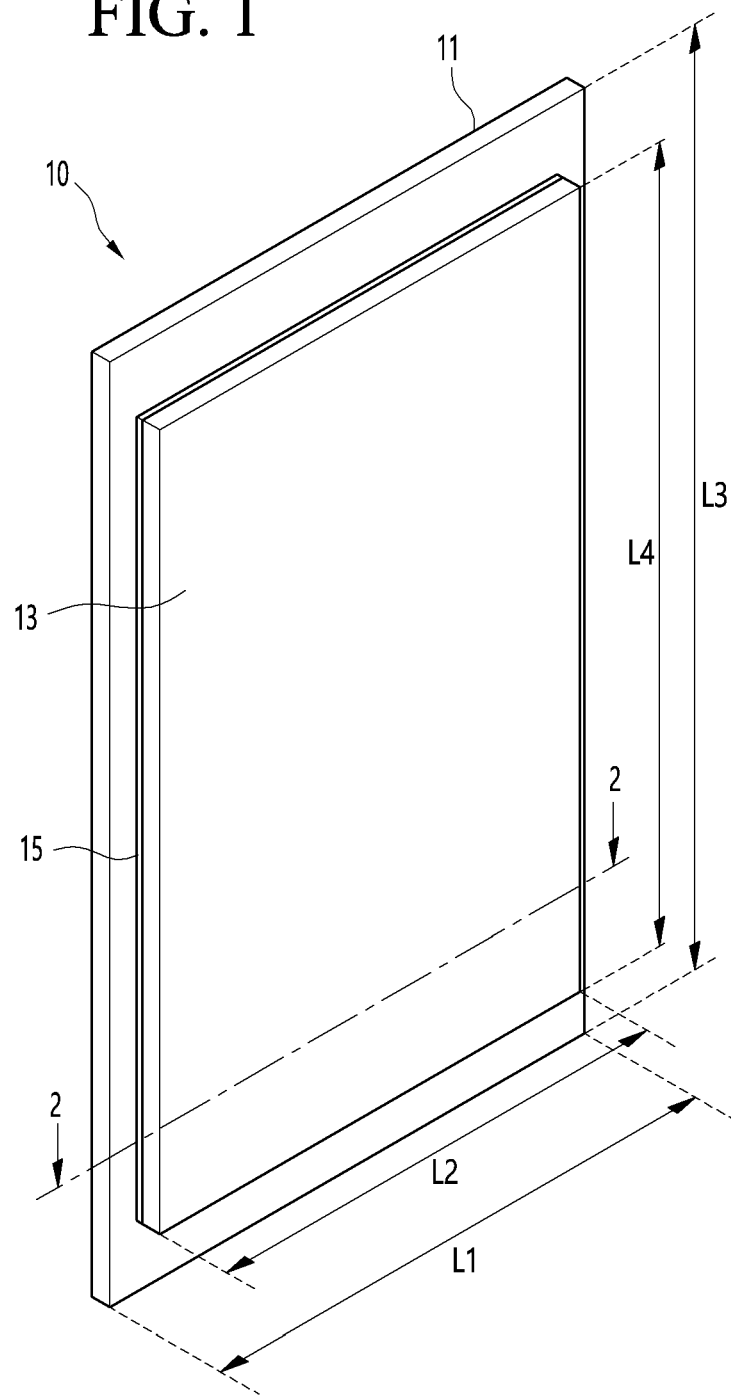
FIG. 1 is a perspective view of a panel assembly according to a first embodiment of the present invention.

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

In the description of the elements of the present invention, the terms first, second, A, B, (a), and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
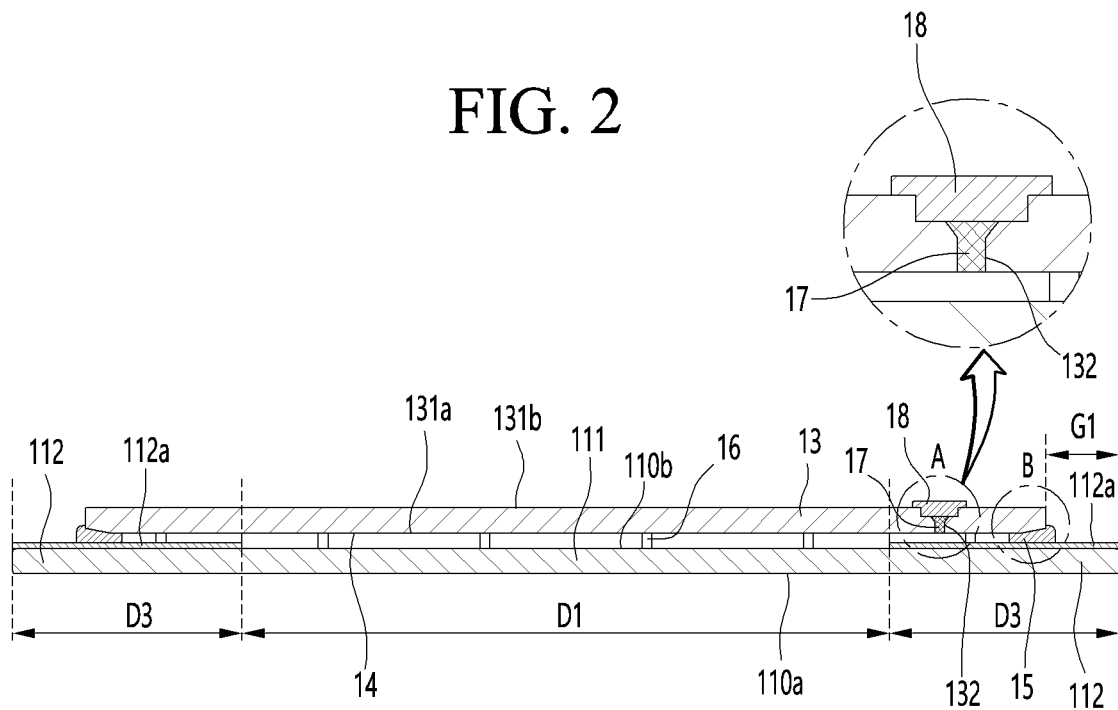
FIG. 2 is a cutaway cross-sectional view taken along line 2-2 of FIG. 1.

FIG. 1 is a perspective view of a panel assembly according to a first embodiment of the present invention, and FIG. 2 is a cutaway cross-sectional view taken along line 2-2 of FIG. 1.

Figure 3:
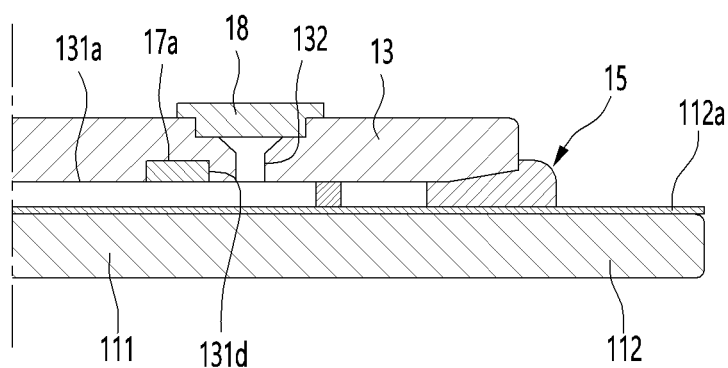
FIG. 3 is a view illustrating a position of a getter in FIG. 2 according to another embodiment.
Figure 4:
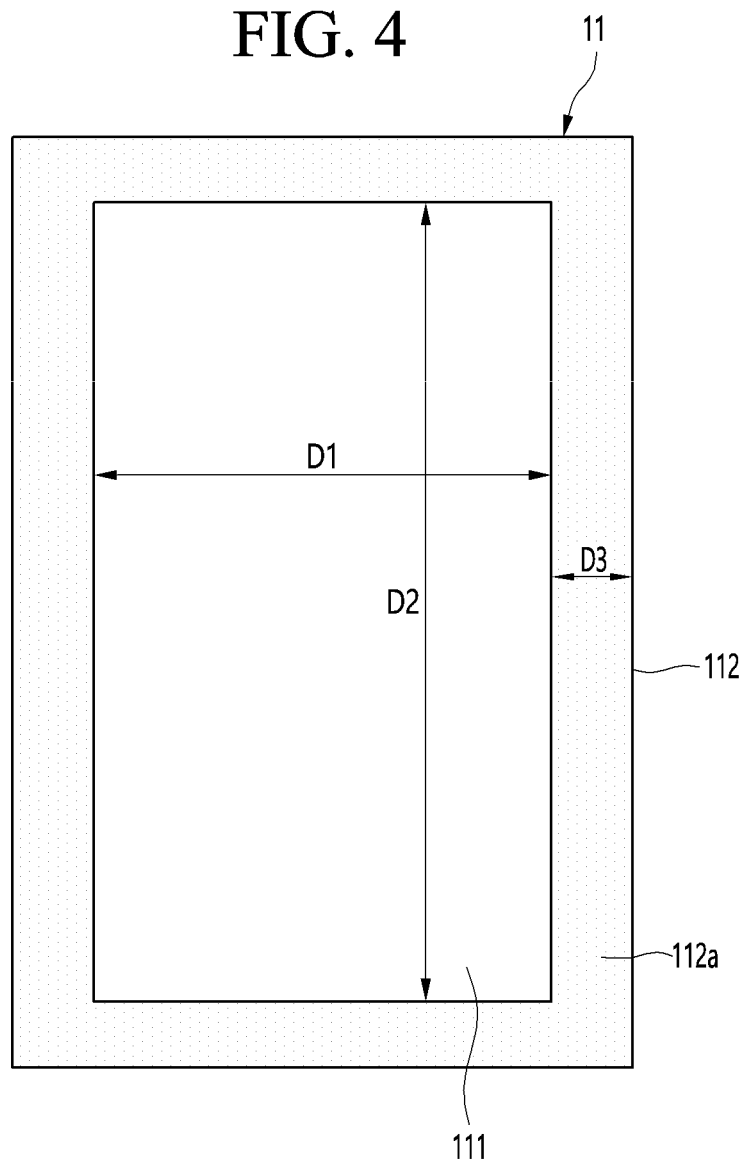
FIG. 4 is a view illustrating a printed layer of a first panel according to the first embodiment of the present invention.

FIG. 3 is a view illustrating a position of a getter in FIG. 2 according to another embodiment. FIG. 4 is a view illustrating a printed layer of a first panel according to the first embodiment of the present invention.

Referring to FIGS. 1 to 4, a panel assembly 10 according to a first embodiment of the present invention includes a first panel 11 and a second panel 13 disposed to be spaced apart from the first panel 11.

The first panel 11 may be made of a glass material. The first panel 11 may be tinted glass.

The first panel 11 may have a thickness of about 3 mm to about 6 mm. The first panel 11 may be reduced in thickness to reduce a total thickness of the panel assembly 10, thereby improving transmittance of light. The light transmittance may be related to visibility to be described later, and if the light transmittance is improved, the visibility may be improved.

If assuming a state in which the panel assembly 10 is used in a home appliance (see FIG. 20), when the first panel 11 is made of tinted glass, if a lighting unit to be described later is turned on, light may pass through the first panel 11 to see an inner space of the home appliance. On the other hand, if the light unit is turned off, the seeing of the inner space of the home appliance may be restricted by the first panel 11.

The first panel 11 may include a first surface 110a and a second surface 110b that is an opposite surface to the first surface 110a.

When the panel assembly 10 is used in the home appliance, the panel assembly 10 may be fixed so that the first surface 110a defines an outer appearance of the home appliance.

The second panel 13 may be made of a glass material. A thickness of the second panel 13 may be the same as or different from a thickness of the first panel 11. The thickness of the second panel 13 may be about 3 mm to about 6 mm.

The second panel 13 may be reduced in thickness to reduce the total thickness of the panel assembly 10, thereby improving the light transmittance.

The second panel 13 may include a first surface 131 facing the second surface 110b of the first panel 11 and a second surface 131b that is an opposite surface of the first surface 131a.

A low-emission coating layer 14 for reducing heat transfer due to radiation may be provided on the first surface 131a. Glass provided with the low-emission coating layer 14 may be referred to as low-ε glass.

In this embodiment, when the low-emission coating layer 14 is formed on the first surface 131a of the second panel 13, the low-emission coating layer 14 may be prevented from being damaged while the panel assembly 10 is manufactured or used after the manufacturing.

As the low-emission coating layer 14 is formed on the second panel 13, the thickness of the second panel 13 may be reduced to improve performance of the insulation glass.

The second panel 13 may be hard low-ε glass or soft low-ε.

The hard low-ε glass may be manufactured by spraying metal oxide ($SnO_2$) as a thermal coating material onto the glass surface and then performing a heat treatment process. The soft low-ε glass may be drafted by placing plate glass in a vacuum chamber and applying metals such as silver, titanium, and stainless steel in the form of multilayer thin film coating.

Alternatively, the second panel 13 may be transparent electrically conductive (TEC) glass formed by applying fluorine doped tin oxide (FTO) under an atmospheric pressure while using the same method as the hard low-ε glass.

A size of the first panel 11 may be larger than a size of the second panel 13. For example, a horizontal length L1 of the first panel 11 may be longer than a horizontal length L2 of the second panel 13.

A vertical length L3 of the first panel 11 may be longer than a vertical length L4 of the second panel 13.

In the panel assembly 10, positions of the first panel 11 and the second panel 13 may be determined so that a side surface of the second panel 13 and a side surface of the first panel 11 are spaced apart from each other.

Thus, the first panel 11 and the second panel 13 may be arranged in a stepped shape.

For example, a gap between the side surface of the first panel 11 and the side surface of the second panel 13 may be G1.

A screen-printed layer 112a may be provided on the second surface 110b of the first panel 11. The printed layer 112a may be disposed along a circumference of the second surface 110b of the first panel 11.

The printed layer 112a may restrict or block the light transmission. The first panel 11 may include a first area 111 through which light is transmitted and a second area 112 disposed outside the first area 112 to restrict the light transmission by the printed layer 112a. The second area 112 may be disposed outside the first area 111 and may be disposed to surround the first area 111.

The second area 112 may transmit the light, but may have a light transmittance less than that of the first area 111 or may completely block the light.

The horizontal length of the first area 111 may be referred to as D1, and the vertical length may be referred to as D2.

The horizontal length D1 and the vertical length D2 of the first area 111 may be the same or different from each other according to a kind of home appliances to which the panel assembly 10 is applied.

In FIG. 4, for example, the vertical length D2 are greater than the horizontal length D1 of the first area 111.

A distance D3 from an end of the first panel 11 to a boundary between the first area 111 and the second area 112 may be greater than a gap G1 between an edge end of the first panel 11 and an edge end of the second panel 13.

Thus, the printed layer 112a may face an edge portion of the second panel 13 as illustrated in FIG. 2.

The distance D3 from the end of the first panel 11 to the boundary between the first area 111 and the second area 112 may vary depending on the type of home appliances to which the panel assembly 10 is applied.

Also, the distance D3 from the end of the first panel 11 to the boundary between the first area 111 and the second area 112 may be the same or different from each other in a circumferential direction of the first panel 11.

The low-emission coating layer 14 may be provided on the entire first area 111 of the first panel 11 and may be provided on a portion of the second area 112 or the entire second area 112.

Since a portion of the second area 112 is in contact with a sealing member to be described later, the low-emission coating layer 14 may not be present. For example, the low-emission coating layer 14 may be formed from an outer end of the second area 112 to a position spaced apart by a predetermined distance.

The first panel 11 and the second panel 13 may be spaced apart from each other by a spacer 16.

For example, the first panel 11 and the second panel 13 may be entirely spaced a predetermined interval from each other by a plurality of spacers 16 that are spaced apart from each other.

The spacer 16 may be, for example, any one of stainless steel, glass, and ceramic.

In this embodiment, when the panel assembly 10 is disposed to allow the light to be transmitted therethrough so that the inner space of the home appliance is seen, the spacer 16 may be preferably made of stainless steel.

When the spacer 16 is made of a stainless steel material, it may have excellent workability and less light reflection to minimize exposure of the spacer 16, as well as improve visibility of the inner space of the home appliance by the panel assembly 10.

On the other hand, when the spacer 16 is made of a glass material, the spacer 16 may appear white or a similar color due to diffuse reflection of light. Therefore, it is preferable that the spacer 16 is made of a stainless material in terms of the non-exposure of the spacer 16 and the visibility of the inner space of the home appliance.

A space between the first panel 11 and the second panel 13 may be a vacuum insulation space. An exhaust hole 132 may be defined in the second panel 13 so that the space between the first panel 11 and the second panel 13 becomes a vacuum insulation space.

Since air is exhausted through the exhaust hole 132, the space between the first panel 11 and the second panel 13 may become the vacuum insulation space.

A gap between the first panel 11 and the second panel 13 may be designed in a range of 0.1 mm to 1 mm.

When the distance between the first panel 11 and the second panel 13 is greater than 1 mm, the spacer 16 for maintaining the distance between the first panel 11 and the second panel 13 may increase in thickness.

Since the spacer 16 is capable of transferring heat, when the thickness of the spacer 16 increases, the heat transfer amount by the spacer 16 in the panel assembly 10 increases to deteriorate thermal insulation performance. In addition, as the size of the spacer 16 increases, the area of the panel assembly 10, through which the light is transmitted may be relatively reduced to deteriorate the visibility.

On the other hand, when a gap between the first panel 11 and the second panel 13 is less than 0.1 mm, a problem in which the first panel 11 and the second panel 13 are in contact with each other due to deformation of the first panel 11 or the second panel 13 while the air is exhausted through the exhaust hole 132 may occur.

However, according to this embodiment, if the distance between the first panel 11 and the second panel 13 is designed to be in the range of 0.1 mm to 1 mm, the gap between the first panel 11 and the second panel 13 may be maintained while preventing the thermal insulation performance and the visibility from being deteriorated.

Preferably, the gap between the first panel 11 and the second panel 13 may be designed in a range of 0.1 mm to 0.5 mm.

The exhaust hole 132 may be defined in a position spaced a predetermined distance inward from the edge end of the second panel 13. However, in order not to expose the exhaust hole 132 to the outside, the exhaust hole 132 may be disposed at a position corresponding to the second area 112 of the first panel 11. The exhaust hole 132 may be disposed to face the printed layer 112a of the first panel 11.

A getter 17 for absorbing moisture in the vacuum insulation space may be disposed in the exhaust hole 132. The getter 17 may be an evaporation type getter or a non-evaporation type getter. It is preferable to use the non-evaporation type getter in views of vacuum maintenance performance and simplification of the process.

The non-evaporation type getter may be a zirconium (Zr) alloy. For example, the getter 17 according to this embodiment may include zirconium (Zr), vanadium (V), iron (Fe), or the like. This getter 17 may adsorb hydrogen, water, carbon monoxide, carbon dioxide, nitrogen, and the like.

When air and moisture do not exist in the vacuum insulation space, thermal convection does not occur. A degree of vacuum in the vacuum insulation space may be $10^{-3}$ Torr or less.

The exhaust hole 132 may be covered by a cover member 18. The cover member 18 may be, for example, frit glass.

Alternatively, the getter 17 may be supported by a supporter (not shown), and at least a portion of the supporter may pass through the exhaust hole 132 and be disposed in the vacuum insulation space. That is, the getter 17 may be disposed in the vacuum insulation space. Even in this case, the cover member 18 may cover the supporter and a portion of the second surface 131b of the second panel 13.

As another example, referring to FIG. 3, the second panel 13 may include an accommodation groove 131d in which the getter 17a is accommodated. The accommodation groove 131d may be disposed around the exhaust hole 132. For example, the accommodation groove 131d may be formed by being recessed from the first surface 131a of the second panel 13 toward the second surface 131b.

The accommodation groove 131d may be disposed at a position corresponding to the second area 112 of the first panel 11 so that the getter 17a accommodated in the accommodation groove 131d is prevented from being exposed to the outside. That is, the accommodation groove 131d may be disposed so as to face the printed layer 112a of the first panel 11.

The panel assembly 10 may further include a sealing member 15 disposed between the edges of the first panel 11 and the second panel 13 to seal a space between the first panel 11 and the second panel 13.

The sealing member 15 may be, for example, frit glass. That is, the sealing member 15 may be a glass sealant.

The sealing member 15 may be made of a material capable of being fired at a temperature of approximately 400° C. or less to prevent performance of the first panel 11 and the second panel 13 from being deteriorated during a firing process.

As an example, the sealing member 15 may be a lead-free glass composition and may include phosphorus pentoxide ($P_2O_5$), vanadium trioxide ($V_2O_3$), and tellurium.

Although not limited, the sealing member 15 may include 5% to 25% by weight of P2O5, 40% to 70% by weight of V2O5, 5% to 25% by weight of TeO2, 1% to 5% by weight of copper oxide (CuO), and 1% to 12% by weight of zinc oxide (ZnO), and 1% to 5% by weight of barium oxide (BaO). The sealing member 15 may be fired at a relatively low temperature by the composition of the sealing member 15.

Also, the content of $P_2O_5$, $V_2O_5$, and $TeO_2$ in the sealing member 15 may satisfy the following relational expression so as to not only be fired at a low temperature, but also be lowered in crystallization tendency during the firing at a low temperature.

$$V_2O_5(\text{wt \%})/P_2O_5(\text{wt \%})<3.5$$

$$P_2O_5(\text{wt \%})+TeO_2(\text{wt \%})>30$$

Also, in order to provide the sealing member 15 having excellent durability without including an inorganic filler or minimizing a content of the inorganic filler and also matching a coefficient of thermal expansion with the glass substrate so as to prevent peeling or breakage from occurring, the sealing member 15 may further include one or more of bismuth oxide ($Bi_2O_3$), manganese dioxide ($MnO_2$), iron oxide ($Fe_2O_3$), and silver oxide ($Ag_2O$).

Figure 5:
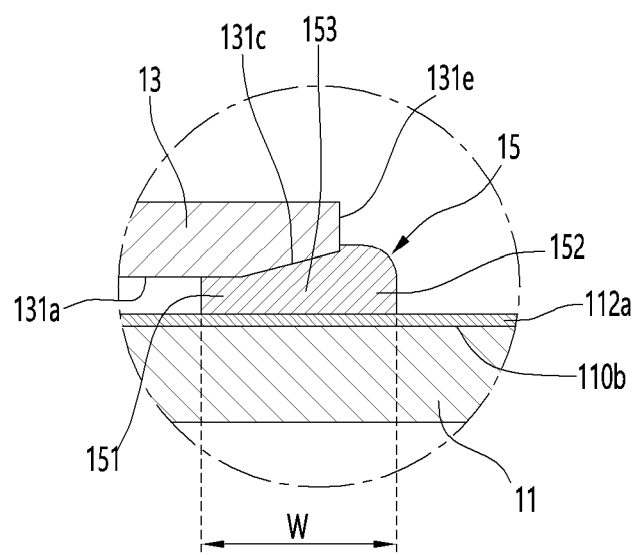
FIG. 5 is an enlarged view of a portion B of FIG. 2.

FIG. 5 is an enlarged view of a portion B of FIG. 2.

Referring to FIG. 5, a portion of the sealing member 15 may be disposed between the first panel 11 and the second panel 13, and the other portion of the sealing member 15 may be in contact with a side surface 131e of the second panel 13 outside the second panel 13.

That is, the sealing member 15 includes a first portion 151 disposed between the first panel 11 and the second panel 13 and a second portion 152 disposed outside the second panel 13. Thus, a thickness of the second portion 152 (a thickness in an arrangement direction of the first panel 11 and the second panel 13) may be greater than a thickness of the first portion 151.

As described in this embodiment, when the sealing member 15 is in contact with the side surface 131e of the second panel 13 outside of the second panel 13, a contact area between the sealing member 15 and the second panel 13 and a contact area between the sealing member 15 and the first panel 11 may increase to increase in close contact strength by the sealing member 15, thereby improving sealability.

Also, as the contact area between the sealing member 15 and the second panel 13 and the contact area between the sealing member 15 and the first panel 11 increase, an impact absorption of the sealing member 15 against an impact applied to the panel assembly 10 may increase.

An edge portion of the first surface 131a of the second panel 13 may be inclined. That is, the first surface 131a of the second panel 13 may include an inclined surface 131c.

The inclined surface 131c may be inclined to move away from the second surface 110b of the first panel 11 toward the outside.

A portion of the first surface 131a of the second panel 13 is parallel to the second surface 110b of the first panel 11, and the other portion (inclined surface 131c) of the first surface 131a of the second panel 13 is not parallel to the second surface 110b of the first panel 11.

Thus, the sealing member 15 may further include a third portion 153 that connects the first portion 151 to the second portion 152 and is in contact with the inclined surface 131c.

A thickness of the third portion 153 is greater than that of the first portion 151. Due to the presence of the third portion 153 by the inclined surface 131c, the contact area between the sealing member 15 and the second panel 13 may further increase.

A width W (length from the first portion to the third portion) of the sealing member 15 may be set within a range of 3 mm to 15 mm.

Since heat is conducted by the sealing member 15, when the width W of the sealing member 15 is greater than 15 mm in terms of heat conduction, a problem of deteriorating the thermal insulation performance occurs. On the other hand, when the width W of the sealing member 15 is less than 3 mm, there is a concern that the sealing performance of the vacuum insulation space is deteriorated.

Thus, as in this embodiment, when the width W of the sealing member 15 is set within the range of 3 mm to 15 mm, the sealing of the vacuum insulation space may be secured, and the thermal insulation performance may be prevented from being deteriorated.

Each of corners of the first panel 11 and the second panel 13 may be rounded at a predetermined curvature.

In a state in which the sealing member 15 is inserted between the first panel 11 and the second panel 13, the first panel 11 and the second panel 13 may be pressed in a direction in which the first panel 11 and the second panel are close to each other to increase in coupling force between the sealing member 15 and the panels 11 and 13.

If there is no inclined surface on the second panel 13, the sealing member 15 may move into the vacuum insulation space while the first panel 11 and the second panel 13 are pressed in the direction in which the first panel 11 and the second panel 13 are close to each other. In this case, there is a problem that the sealing member 15 is in contact with the spacer 16 or is spread to the first area 111. In this case, the first area 111 is reduced by the sealing member 15 to reduce the visibility.

However, as in the present invention, when the second panel 13 includes the inclined surface 131c, while the first panel 11 and the second panel 13 are pressed in the direction in which the first panel 11 and the second panel are close to each other, since the sealing member 15 moves to the portion at which the inclined surface 131c is formed, the movement of the vacuum insulation space may be minimized.

Figure 6:
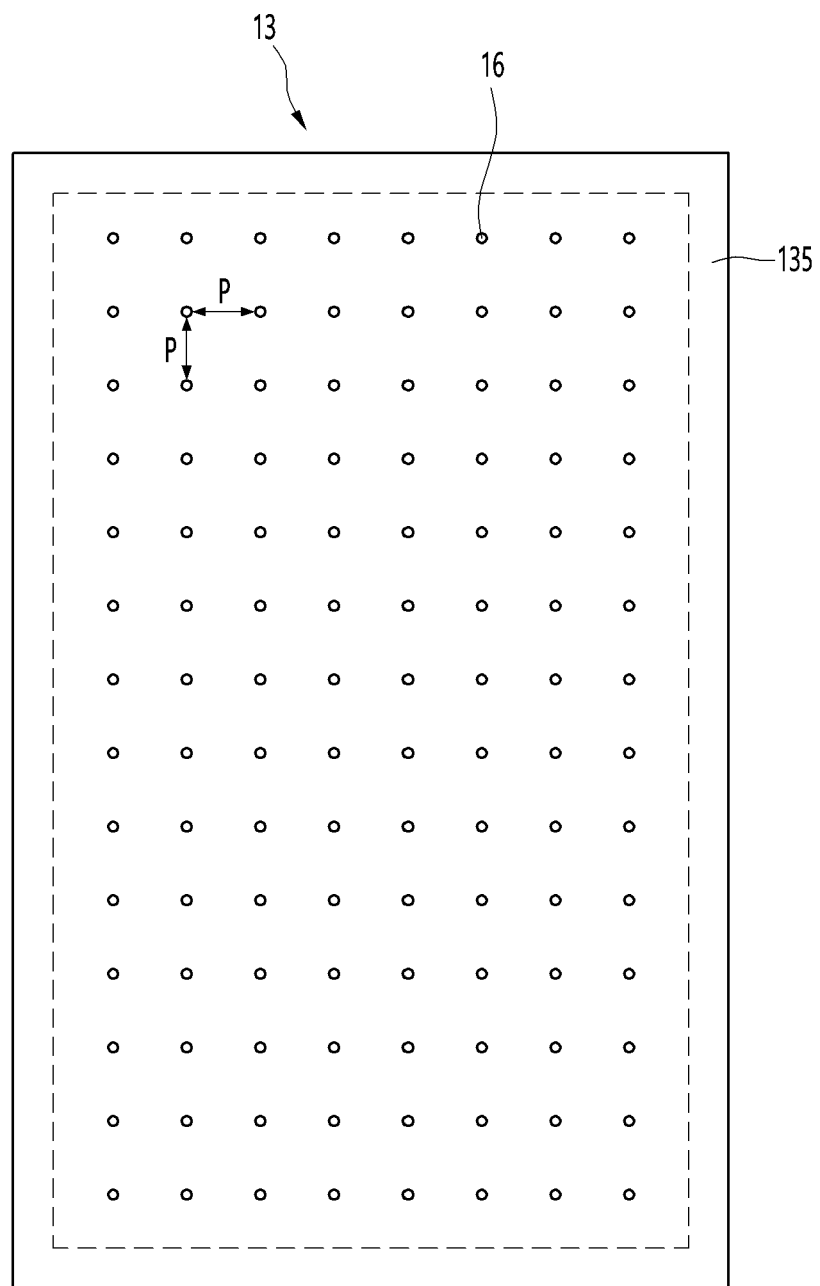
FIG. 6 is a view illustrating an arrangement of a spacer on a second panel according to the first embodiment of the present invention.

FIG. 6 is a view illustrating an arrangement of the spacer on the second panel according to the first embodiment of the present invention.

Referring to FIGS. 2 and 6, the spacers 16 may be spaced apart from each other in a first direction and may be spaced apart from each other in a second direction crossing the first direction.

For example, the plurality of spacers 16 may be arranged to be spaced apart in the vertical and horizontal directions.

The plurality of spacers 16 may be arranged to have a constant pitch P in the horizontal direction and may be arranged to have a constant pitch P in the vertical direction.

According to this arrangement, not only the plurality of spacers 16 may be arranged in the vertical line direction, but the plurality of spacers 16 may be arranged in the horizontal direction. The arrangement of the spacers in FIG. 6 may be referred to as an orthogonal arrangement.

However, in the manufacturing process, while the plurality of spacers 16 are orthogonally arranged on the first panel 11 by a separate mechanism (not shown), the second panel 13 is seated on the plurality of spacers 16.

Referring to FIG. 6, in the second panel 13, the sealing member 15 may be disposed in an area 135 between a dotted line and an edge of the second panel 13. The area 135 may also be referred to as a sealing member contact area. The contact area is disposed to surround the plurality of spacers 16. In another aspect, the plurality of spacers 16 are disposed in an area inside the contact area, and the plurality of spacers 16 are spaced apart from the sealing member 15.

Figure 7:
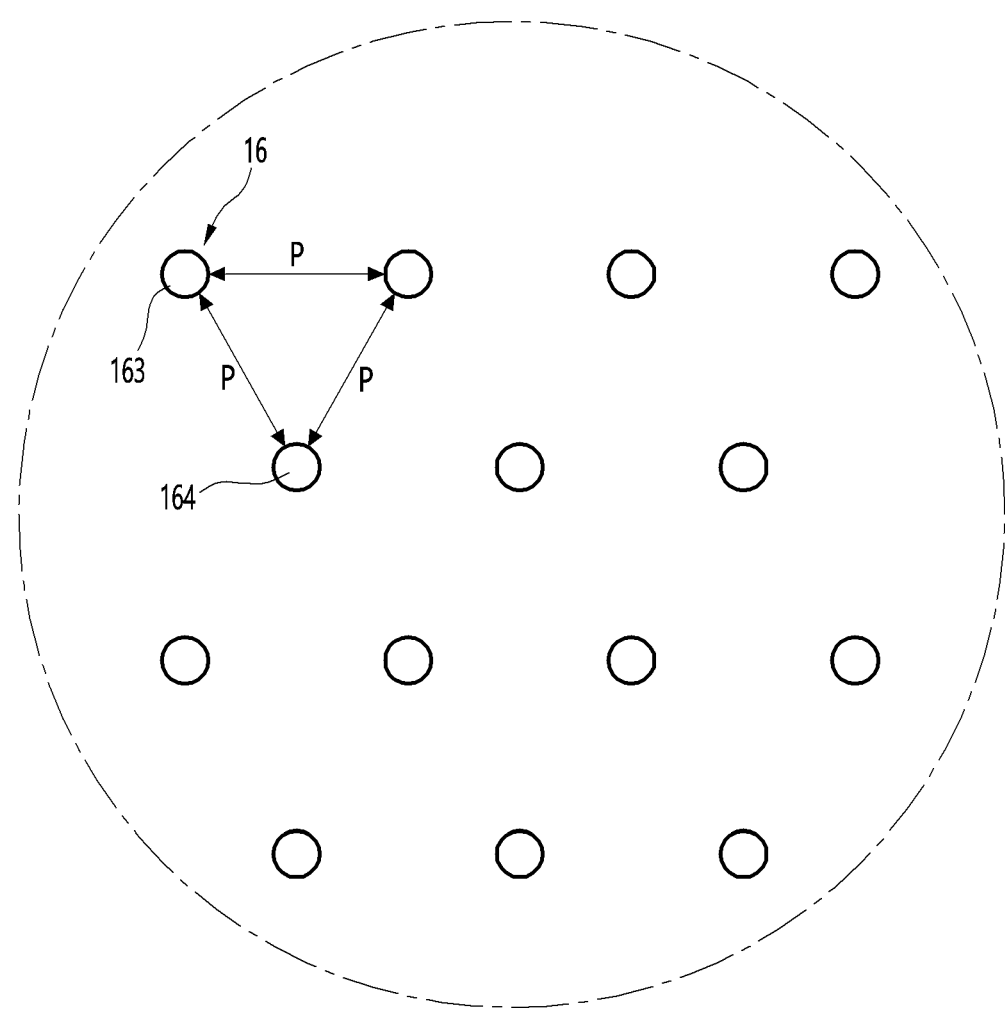
FIG. 7 is a view illustrating another example of the arrangement of the spacer according to the present invention.

FIG. 7 is a view illustrating another example of the arrangement of the spacer according to the present invention.

Referring to FIG. 7, the plurality of spacers 16 may be disposed to be spaced apart in the horizontal direction and the vertical direction.

For example, the plurality of spacers 163 in a first row may be disposed to be spaced a predetermined pitch P from each other in the horizontal direction.

The plurality of spacers 164 in a second row disposed below the first row may be disposed to be spaced a predetermined pitch P from each other in the horizontal direction. However, the plurality of spacers 163 in the first row and the plurality of spacers 164 in the second row may be disposed to be spaced a predetermined pitch P from each other without overlapping each other in the vertical direction.

In other words, the spacers 164 in the second row may be disposed on an area corresponding to the area between the two adjacent spacers 163 in the first row. The arrangement of the spacers in FIG. 7 may be referred to as a diamond arrangement.

Figure 8:
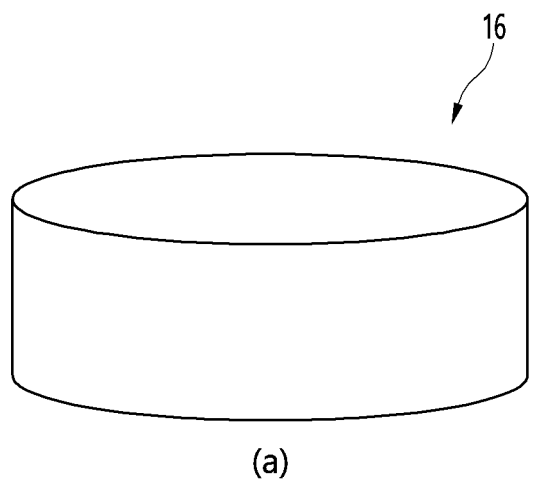
FIG. 8 is a view illustrating various shapes of the spacer.
Figure 8:
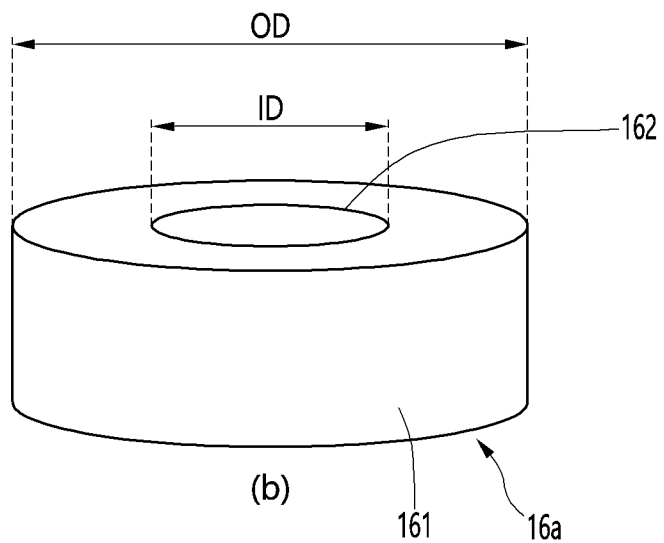

FIG. 8 is a view illustrating various shapes of the spacer.

(a) of FIG. 8 illustrates one form of the spacer, and (b) of FIG. 8 illustrates another form of the spacer.

Referring to (a) of FIG. 8, the spacer 16 may have a cylindrical shape or a shape similar to a cylinder.

Referring to (b) of FIG. 8, the spacer 16a may have a tube shape. That is, the spacer 16a may include an outer circumferential surface 161 and an inner circumferential surface 162. A diameter OD of the outer peripheral surface 161 may be the same as or similar to a diameter of the cylindrical spacer. A diameter ID of the inner peripheral surface 162 may be less than the diameter of the cylindrical spacer.

In another aspect, the spacer 16a may have a cylindrical shape having a hollow.

Although FIG. 8 illustrates that each of the spacers 16 and 16a has a smooth surface, this is merely an example. For example, it may be possible to form an unevenness on the surface of each of the spacers 16 and 16a, and the spacers 16 and 16a may have a polygonal pillar shape.

A maximum distance between the diameter of each of the spacers 16 and 16a or the outer circumferential surface and a line connecting two points to each other may be set within a range of 200 microns to 900 microns.

A contact area between one spacer 16 or 16a and the second panel 13 may be different depending on the shape of each of the spacers 16 and 16a.

If the spacers 16 and 16a are concentrated into a certain area in relation to the second panel 13, or the spacers 16 and 16a are not arranged evenly, possibility in which the spacers 16 and 16a are exposed to the outside may be high, and visibility of a certain area of the panel assembly may be significantly lowered due to the spacers 16 and 16a.

However, as in this embodiment, when the spacers 16 and 16a are arranged at a predetermined pitch, the spacers 16 and 16a itself may be seen from the outside while maintaining the gap between the first panel 11 and the second panel 13 to improve the visibility of the panel assembly 10.

In this embodiment, the diameter of each of the plurality of spacers 16 and 16a and the gap between the spacers may be determined so that the contact area between each of the plurality of spacers 16 and 16a and the second panel 13 corresponds to 0.01% to 0.05% of the area of the first surface 131a in the second panel 13.

When the contact area between each of the plurality of spacers 16 and 16a and the second panel 13 is less than 0.01% of the area of the first surface 131a in the second panel 13, the spacer 16 may not maintain the gap between the first panel 11 and the second panel 13 while air is removed from the space between the first panel 11 and the second panel 13. In this case, a problem occurs in that the first panel 11 and the second panel 13 are in contact with each other (in view of maintaining the gap between the first panel and the second panel).

On the other hand, when the contact area between each of the plurality of spacers 16 and 16a and the second panel 13 is greater than 0.05% of the area of the first surface 131a in the second panel 13, the spacers 16 and 16a may be exposed to the outside. That is, when light passes through the panel assembly 10, the spacers 16 and 16a are visible to the outside, and the area through which the light is transmitted by the spacer 16 relatively decreases. Thus, there is a problem that the visibility of the inner space is deteriorated (in view of the visibility).

Also, since the areas of the spacers 16 and 16a increases, an amount of thermal conductivity by the spacers 16 and 16a may increase to deteriorate the thermal insulation performance (in view of the thermal insulation performance of the panel assembly).

However, as in this embodiment, when the contact area between each of the plurality of spacers 16 and 16a and the second panel 13 is set within the range of 0.01% to 0.05% of the area of the first surface 131a in the second panel 13, there may be an advantage in that the visibility by the panel assembly 10 is improved while the gap between the first panel 11 and the second panel 13 is maintained.

The pitch of each of the adjacent spacers 16 and 16a may vary by a ratio of the contact area between each of the plurality of spacers 16 and the second panel 13 and the area of the first surface 131a in the second panel 13, but may be determined within a range of approximately 20 mm to 60 mm.

The thickness of each of the spacers 16 and 16a is substantially the same as the gap between the first panel 11 and the second panel 13.

The ratio between the pitch of each of the adjacent spacers 16 and 16a and the ratio of the contact area between each of the plurality of spacers 16 and the second panel 13 and the area of the first surface 131a of the second panel 13 may also be related to impact resistance of the first panel 11 and the second panel 13.

Basically, a vacuum pressure is applied to the first panel 11 and the second panel 13, which are in contact with the spacers 16 and 16a. In this state, even if an external impact is applied to the first panel 11 and the second panel 13, the first panel 11 and the second panel 13 have to be prevented from being damaged.

As in this embodiment, when the contact area between each of the plurality of spacers 16 and 16a and the second panel 13 increases to 0.01% to 0.05% of the area of the first surface 131a in the second panel 13, even if the external impact is applied to the first panel 11 and the second panel 13, the damage of the first panel 11 and the second panel 13 may be minimized. Preferably, the contact area between each of the plurality of spacers 16 and 16a and the second panel 13 may satisfy a range of 0.025% to 0.03% of the area of the first surface 131a in the second panel 13.

In summary, according to the spaced arrangement of the spacers 16 and 16a proposed in this embodiment, the panel assembly 10 may decrease in thickness while maintaining the thermal insulation performance by the area ratio of the spacers 16 and 16a and the second panel 13, and the gap between the first panel and the second panel.

Also, the visibility of the inner space of the home appliance by the panel assembly 10 and the impact resistance to the external impacts may be improved.

Also, since the spacers 16 and 16a are not exposed to the outside, an aesthetic feeling of the panel assembly 10 itself may be prevented from being deteriorated.

Figure 9:
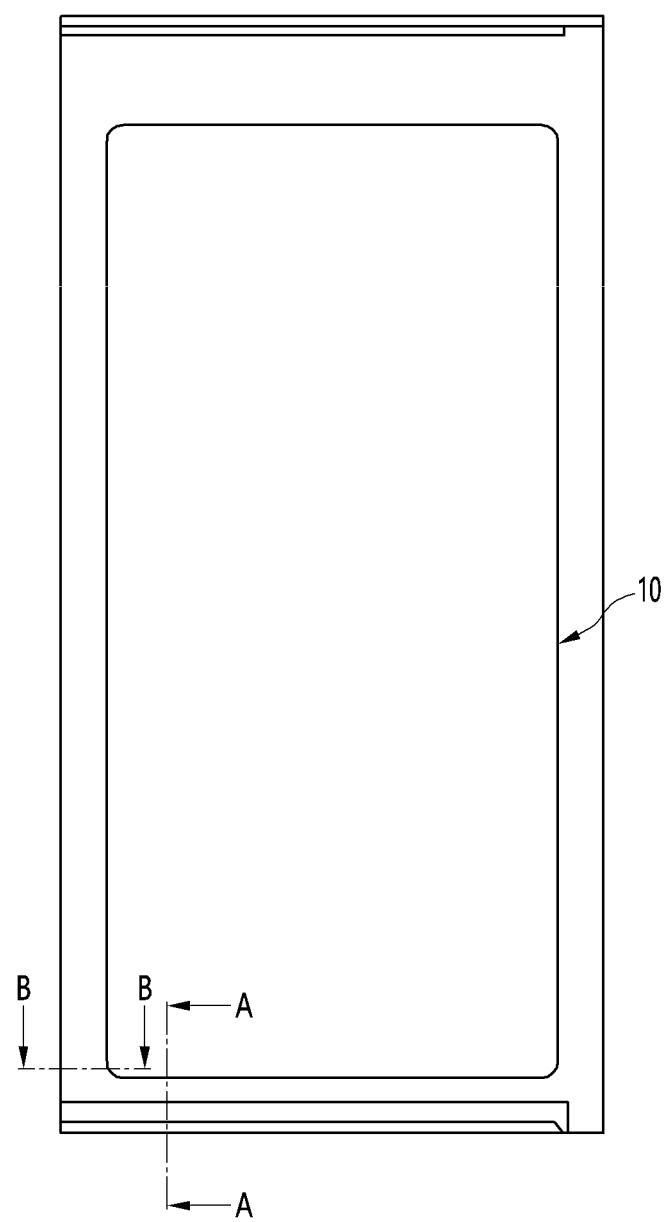
FIG. 9 is a view of a door to which a panel assembly is applied according to the first embodiment of the present invention.
Figure 10:
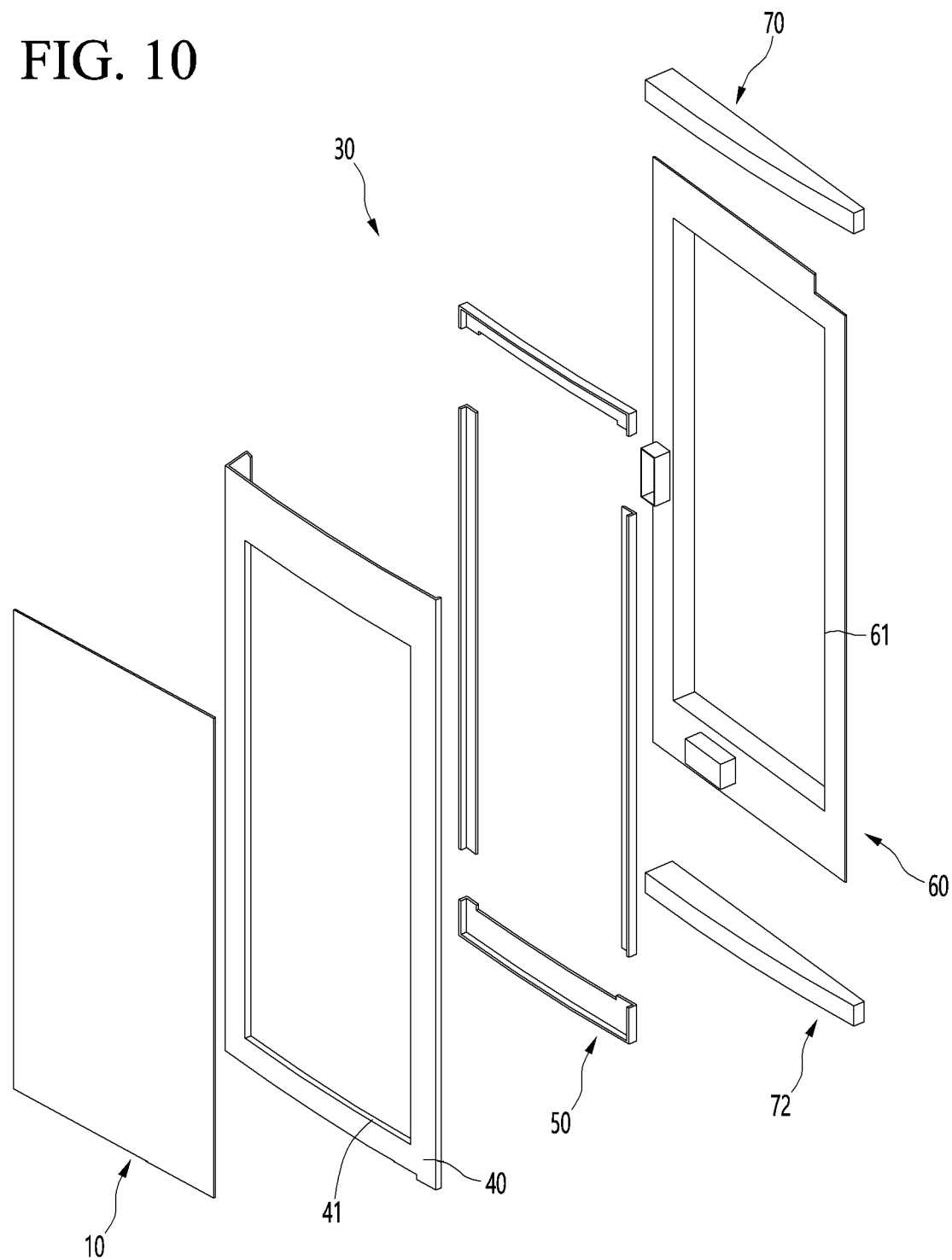
FIG. 10 is an explode perspective view of FIG. 9.
Figure 11:
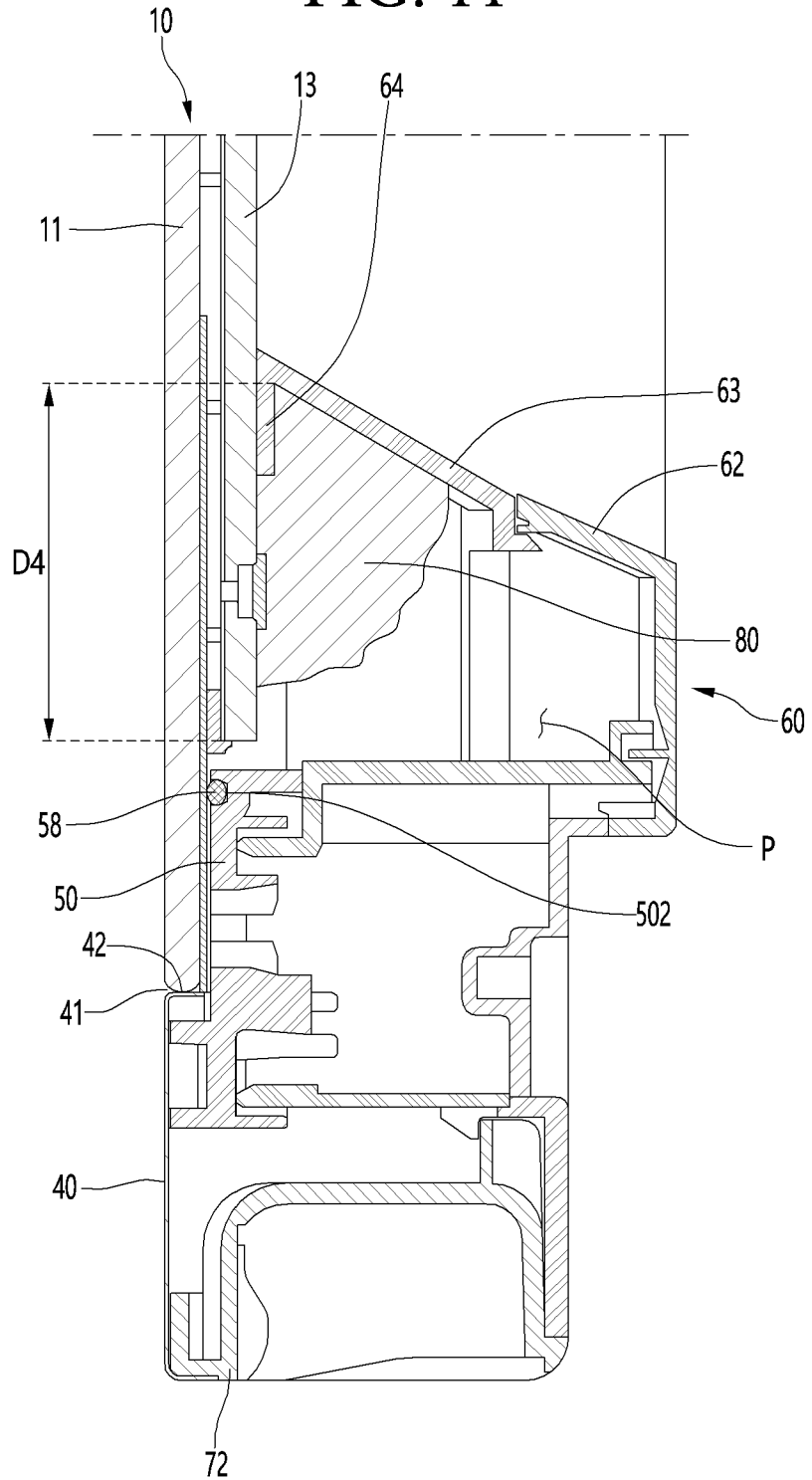
FIG. 11 is a cross-sectional view taken along line A-A of FIG. 9.
Figure 12:
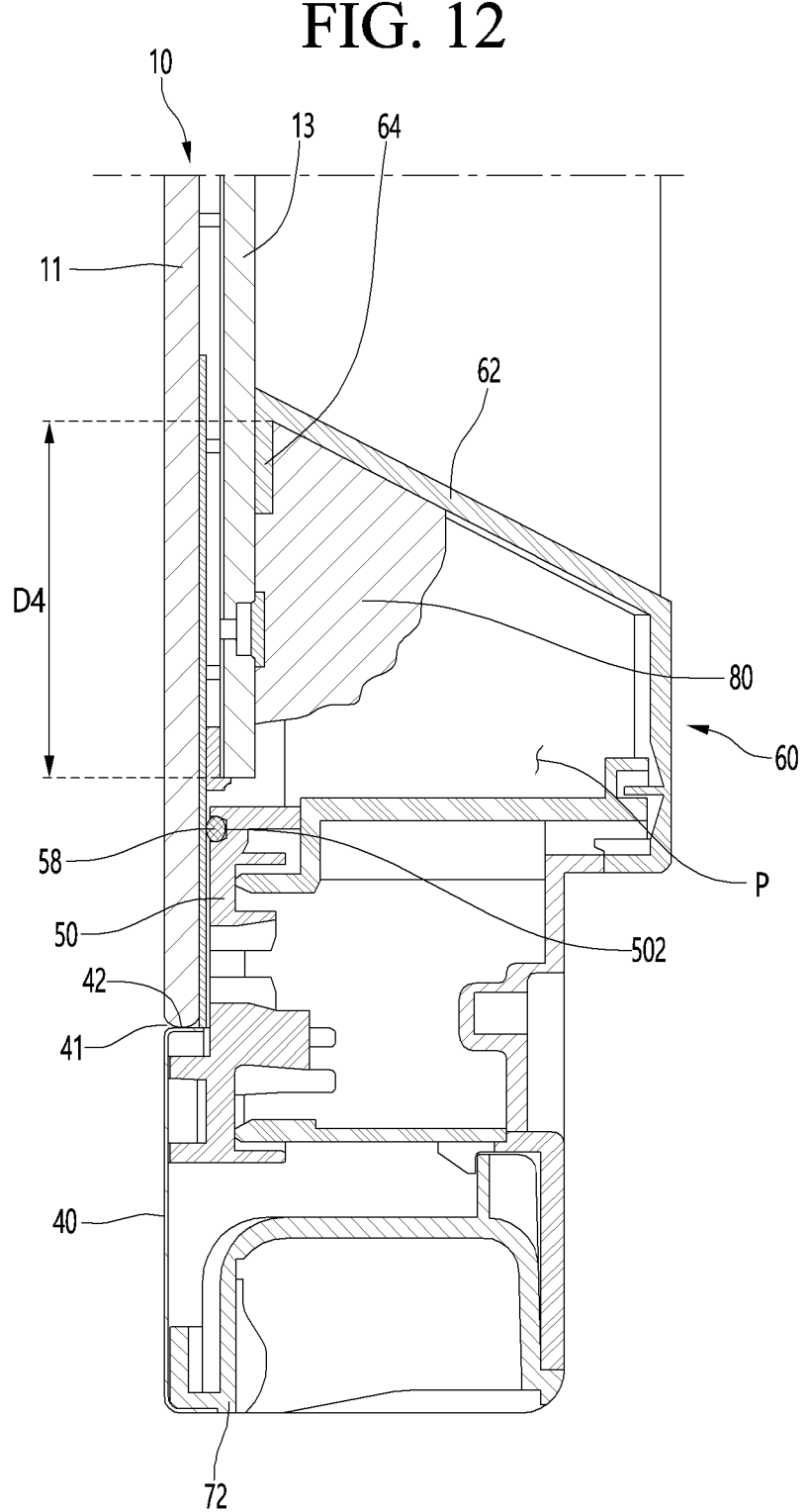
FIG. 12 is a view illustrating another example of FIG. 9.
Figure 13:
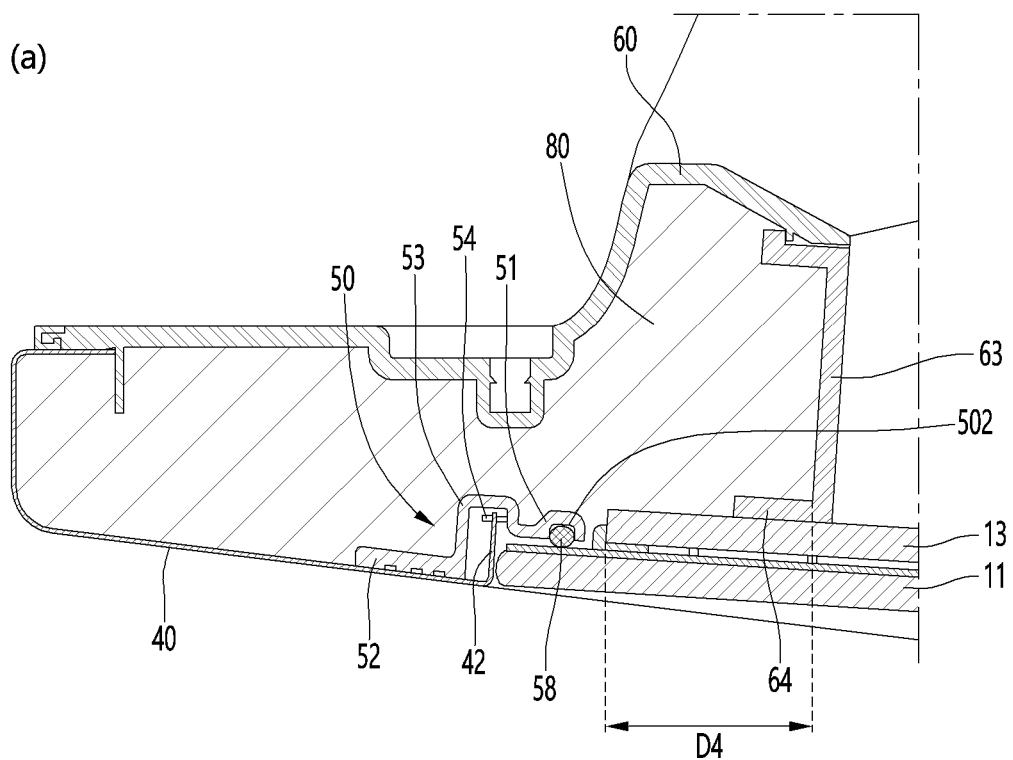
FIG. 13 is a sectional view taken along line B-B of FIG. 9.
Figure 13:
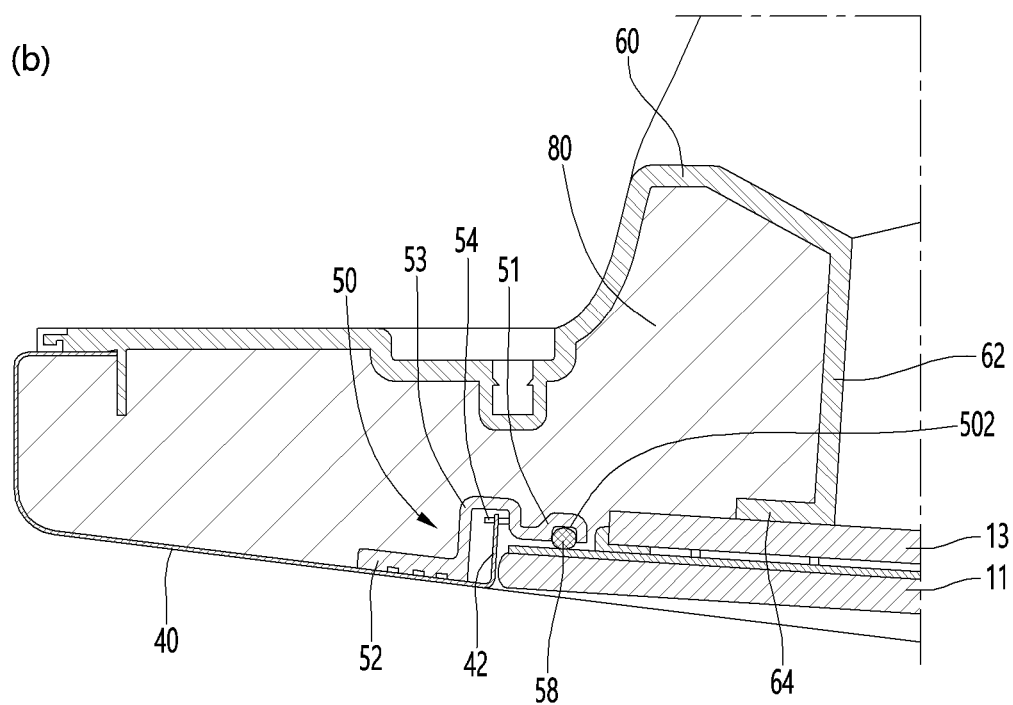

FIG. 9 is a view of a door to which a panel assembly is applied according to the first embodiment of the present invention, and FIG. 10 is an explode perspective view of FIG. 9. FIG. 11 is a cross-sectional view taken along line A-A of FIG. 9, FIG. 12 is a view illustrating another example of FIG. 9, and FIG. 13 is a sectional view taken along line B-B of FIG. 9.

Figure 14:
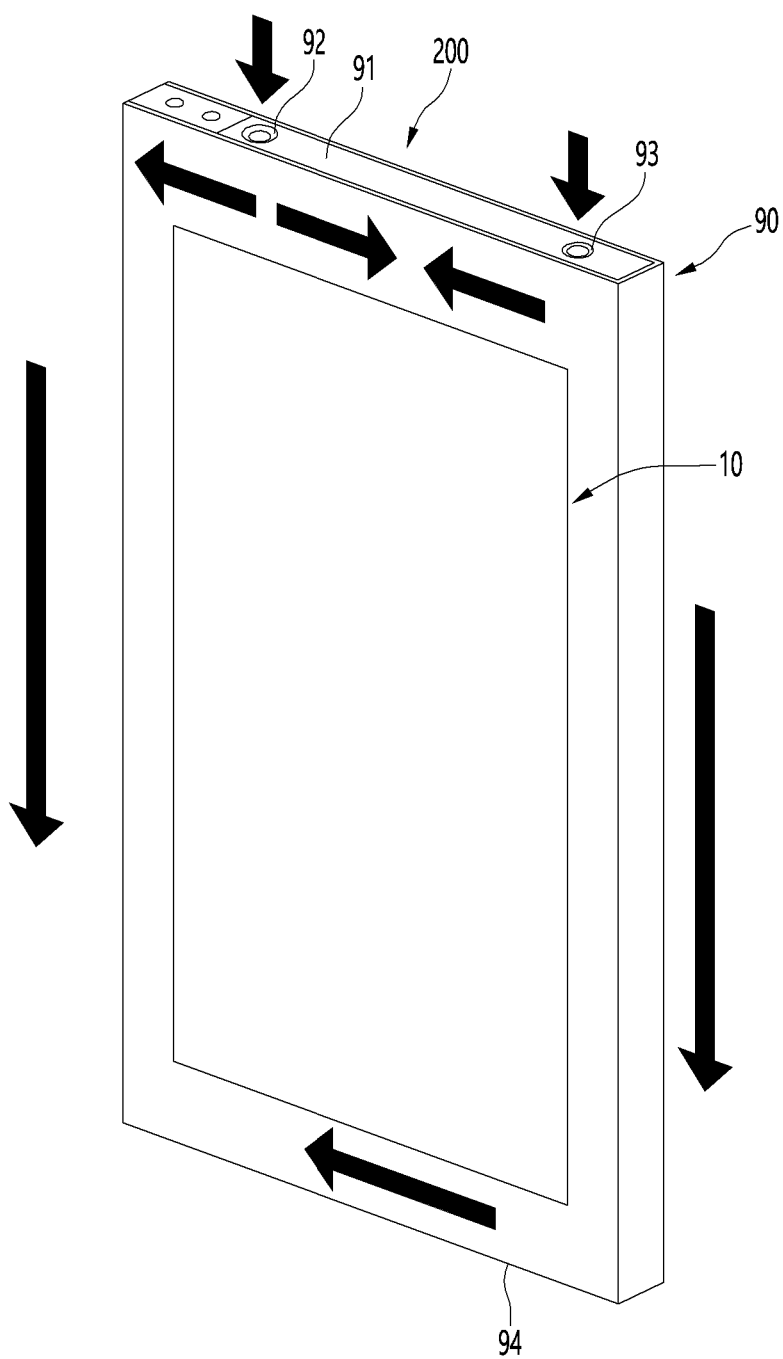
FIG. 14 is a perspective view illustrating a state in which an injection hole is defined in the door according to the first embodiment.

FIG. 14 is a perspective view illustrating a state in which an injection hole is defined in the door according to the first embodiment.

In FIG. 11, it is illustrated that an insulation space is partially filled with an insulation material.

Referring to FIGS. 9 to 14, a panel assembly 10 according to this embodiment may be used for a door 30 of a home appliance. That is, the door 30 may include the panel assembly 10.

The door 30 may further include a door frame 40 supporting the panel assembly 10 and a door liner 60 connected to the door frame 40. The door frame 40 and the door liner 60 may be collectively referred to as a frame.

The door frame 40 may be made of, for example, a metal material. The door frame 40 may include a first opening 41. The panel assembly 10 may cover the first opening 41.

As the door frame 40 and the panel assembly 10 are made of different materials, in order to fix positions of the door frame 40 and the panel assembly 10 to each other, the door 30 may further include a bracket 50.

A portion of each of the door frame 40 and the door liner 60 may be directly connected, and other portion may be connected by connection members 70 and 72. For example, both sides of the door frame 40 may be directly connected to the door liner 60, and upper and lower sides of the door frame 40 may be connected by connection members 70 and 72.

The door frame 40, the door liner 60, and the connection members 70 and 72 may be collectively referred to as a frame assembly 90.

The door liner 60 may include a second opening 61. The panel assembly 10 may cover the second opening 61.

The door liner 60 may include a bent portion 62 that is bent from the second opening 61 toward the door frame 40. Alternatively, the door liner 60 may include a bent portion 62 extending toward the first opening 41, and the bent portion 62 may define the second opening 61.

The bracket 50 may be coupled to directly contact the door frame 40 and the panel assembly 10 or may be coupled while indirectly contacting the door frame 40 and the panel assembly 10 by an intermediate member.

The door frame 40 may be provided as a thin plate and may include a bent portion 42 that is bent inward from the first opening 41. An inner region of the bent portion 42 substantially becomes the first opening 41.

The panel assembly 10 may be disposed at the first opening 41 to cover the first opening 41 or may cover the first opening 41 from an outside of the first opening 41.

A side surface of the panel assembly 10 may be in contact with the bent portion 42. For example, the side surface of the first panel 11 may be in contact with the bent portion 42.

The first panel 11 may define a portion of a front appearance of the door 30.

A front surface (first surface) of the first panel 11 may define the same surface as a front surface of the door frame 40, or a line passing through the front surface of the first panel 11 may pass through the front surface of the door frame 40. Alternatively, the front surface of the first panel 11 and the front surface of the door frame 40 may be stepped. However, in this case, in order to prevent the first panel 11 from being damaged, the front surface of the first panel 11 may be disposed behind the front surface of the door frame 40.

The bracket 50 may include a first portion 51 disposed to face the first panel 11, a second portion 52 disposed to face the door frame 40, and a third portion 53 connecting the first portion 51 to the second portion 52.

The first portion 51 of the bracket 50 may face a rear surface (second surface) of the first panel 11, and the second portion 52 of the bracket 50 may face a rear surface of the door frame 40.

For example, the first portion 51 of the bracket 50 may be disposed to correspond to the second area 112 of the first panel 11. That is, the first portion 51 of the bracket 50 may be disposed to face the second area 112 of the first panel 11.

Thus, even if the panel assembly 10 is installed on the door 30, the bracket 50 may be prevented from being exposed to the outside.

The first portion 51 of the bracket 50 may be provided with a coupling protrusion 54, and the bent portion 42 may be provided with a protrusion slot (not shown) into which the coupling protrusion 54 is inserted.

A heater accommodation groove 502 may be defined in the first portion 51 of the bracket 50. A heater 58 may be accommodated in the heater accommodation groove 502.

The heater 58 may be fixed to the rear surface of the first panel 11 or be fixed to the first portion 51 of the bracket 50 by an adhesive tape (for example, an aluminum tape). Alternatively, an aluminum sheet may be attached to a portion corresponding to the heater 58 on the rear surface of the first panel 11, and the heater 58 may be disposed to be in contact with the aluminum sheet. Even in this case, the heater 58 may be fixed to the bracket 50 by an adhesive tape (for example, an aluminum tape) while being accommodated in the heater accommodation groove 502.

The heater 58 may prevent dew condensation from being generated by allowing a surface temperature of a peripheral portion of the side surface of the panel assembly 10 to increase. Heat of the heater 58 may be transferred to the first panel 11 and may also be transferred to the second panel 13 and the sealing member 15.

In the case of this embodiment, since the panel assembly has a vacuum insulation space, a thickness of the panel assembly may be reduced compared to a structure in which a gas is filled between two panels.

When the panel assembly 10 according to this embodiment is applied to the structure of the existing door 30, a gap between the panel assembly 10 and the bent portion 62 of the door liner 60 may occur by a reduced thickness of the panel assembly 10.

If, without changing the structure of the existing door liner 60, the panel assembly 10 according to this embodiment is used, as illustrated in FIG. 11 and (a) of FIG. 13, the door 30 may further include an intermediate member 63 disposed in a spaced portion between the door liner 60 and the panel assembly 10.

One side of the intermediate member 63 may be coupled to the door liner 60, and the other side may be in contact with the panel assembly 10. For example, the intermediate member 63 may be in contact with the rear surface (second surface) of the second panel 13.

The intermediate member 63 may further include a contact portion 64 to increase in contact area between the intermediate member 63 and the second panel 13.

Referring to FIG. 12 and (b) of FIG. 13, as another example of the door liner 60, the intermediate member may not exist as a separate member 63, and the bent portion 62 of the door liner 60 may extend toward the second panel 13, and the contact portion 64 may extend from the second panel 13.

In either case, the door frame 40, the door liner 60, the bracket 50, and the panel assembly 10 may define an insulation space P in which an insulation material 80 is filled. That is, the frame assembly 90 and the panel assembly 10 may define an insulation space P.

Referring to FIG. 13, the frame assembly 90 may be provided with a plurality of injection holes for injecting a foaming solution for forming the insulation material 80.

For example, the plurality of injection holes may be defined to be spaced apart from a top surface 91 or a bottom surface of the frame assembly 90. For example, FIG. 13 illustrates that a first injection hole 92 and a second injection hole 93 are defined in the top surface 91 of the frame assembly 90.

The first injection hole 92 and the second injection hole 93 may be disposed to face the insulation space P. The first injection hole 92 may face a space defined at one side of the panel assembly 10 in the insulation space P, and the second injection hole 93 may face a space defined at the other side of the panel assembly in the insulation space P. The foaming solution injected through the two injection holes 92 and 93 may not only flow in a horizontal direction in the insulation space P, but also flow in a downward direction so as to be filled into the insulation space P as a whole.

The contact portion 64 of the door liner 60 may be in contact with a position spaced a predetermined distance from an edge end of the second panel 13.

The insulation material 80 may be in contact with the door frame 40, the door liner 60, and the bracket 50. Also, the insulation material 80 may be in contact with a rear surface (second surface) of the second panel 13.

A portion of the insulation material 80 may be in contact with the contact portion 64 to press the contact portion 64 toward the second panel 13. Thus, the insulation material 80 between the contact portion 64 and the second panel 13 may be prevented from leaking.

Since the panel assembly 10 itself includes the vacuum insulation space, the thermal insulation performance may be maintained by the vacuum insulation space. On the other hand, since the outer surface of the panel assembly 10, in particular, the sealing member 15 is capable of conducting heat, there is a need to prevent the thermal insulation performance due to the heat conduction.

In order to prevent deterioration in thermal insulation performance due to the heat conduction of the panel assembly 10, the insulation material 80 may be in contact with the rear surface (second surface) of the second panel 13. Also, the insulation material 80 may be in contact with a side surface of the second panel 13 and a portion of the sealing member 15.

The insulation material 80 may be disposed to overlap the second panel 13 in a front and rear direction (which may be defined as an arranged direction of the panels). In order to secure the thermal insulation performance, the vertical or horizontal length (overlapping length) D4 of the portion of the second panel 13 overlapping the insulation material 80 in the front and rear direction may be set within a range of 20 mm to 50 mm.

When the overlapping length of the insulation material 80 and the second panel 13 is less than 20 mm, a heat conduction blocking effect by the insulation material 80 is low, and thus, there is a concern that dew is generated on the surface of the panel assembly 10.

On the other hand, when the overlapping length of the insulation material 80 and the second panel 13 is greater than 50 mm, there may be a disadvantage in that the area on which light is transmitted in the panel assembly 10 is reduced to reduce the visibility of the inner space.

However, as in the present invention, when the overlapping length D4 of the insulation material 80 and the second panel 13 is set within the range of 20 mm to 50 mm, the visibility may increase, and thermal insulation performance may also be maintained.

Figure 15:
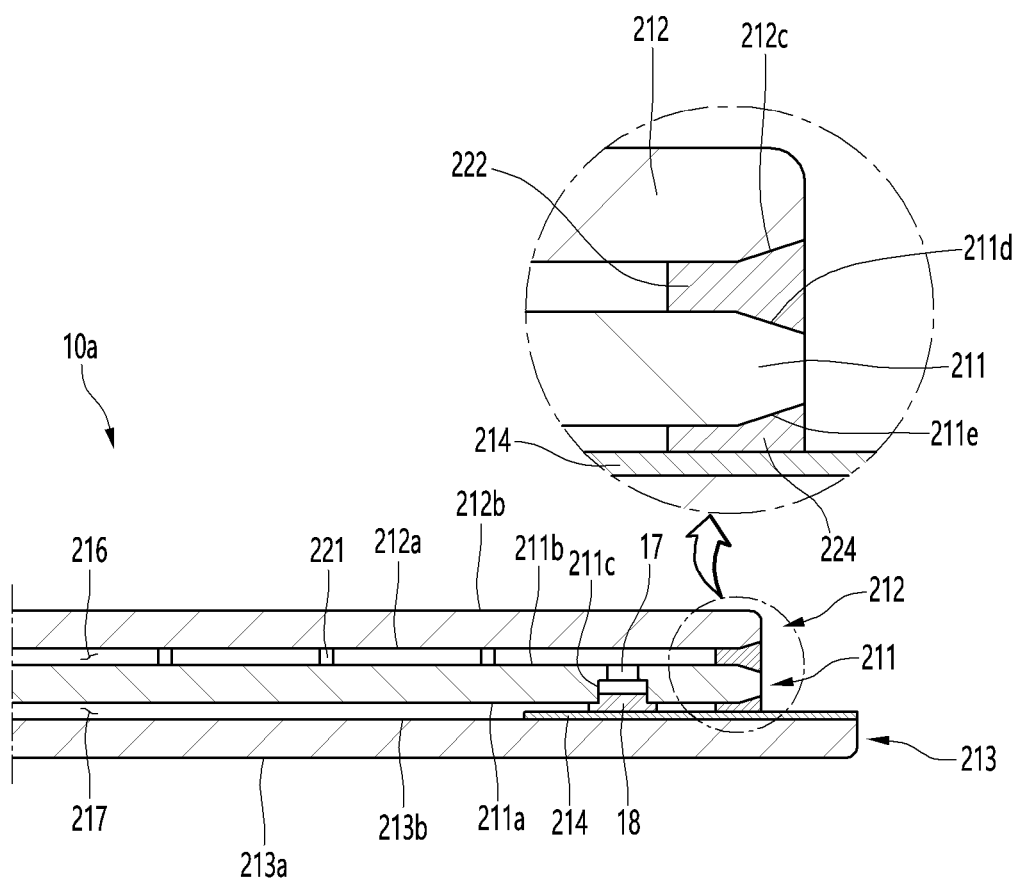
FIG. 15 is a cross-sectional view of a panel assembly according to a second embodiment of the present invention.

FIG. 15 is a cross-sectional view of a panel assembly according to a second embodiment of the present invention.

Referring to FIG. 15, a panel assembly 10a according to this embodiment includes a first panel 211, a second panel 212 disposed behind the first panel 211, and a third panel 213 disposed in front of the first panel 211. The third panel 213 may be disposed at an opposite side of the second panel 212 with respect to the first panel 211.

The first panel 211 and the second panel 212 are spaced apart from each other by a plurality of spacers 221, and a vacuum insulation space 216 between the first panel 211 and the second panel 212) is defined.

All the characteristics described in the first embodiment such as the thickness, the material, the low-emission coating layer of each of the panels described in the first embodiment, the gap between the first panel 11 and the second panel 13, the degree of the vacuum of the vacuum insulation space, the size or shape of the spacer, the contact ratio of the spacer and the first or second panel, and the structure, the material, and the component of the sealing member may be equally or similarly applied to the second embodiment.

Thus, only characterized parts in the second embodiment will be described below.

The first panel 211 may include a first surface 211a that is a front surface and a second surface 211b that is a rear surface. The second panel 212 may include a first surface 212a that is a front surface and a second surface 212b that is a rear surface. The third panel 213 may include a first surface 213a that is a front surface and a second surface 213b that is a rear surface.

The first surface 212a of the second panel 212 may face the second surface 211b of the first panel 211. The first surface 211a of the first panel 211 may face the second surface 213b of the third panel 213.

An exhaust hole 211c for exhausting air may be defined in the first panel 211 to define a vacuum insulation space 216. A getter 17 is disposed in the exhaust hole 211c, a getter 17 is installed at a position adjacent to the exhaust hole 211c in the first panel 211, or a getter 17 is installed in the second panel 212.

Also, a low-emission coating layer may be disposed on at least one of the first panel 211 or the second panel 212. For example, the low-emission coating layer may be disposed on the first surface 211a or the second surface 211b of the first panel 211, or the low-emission coating layer may be disposed on the first surface 212a of the second panel 212.

The exhaust hole 211c may be blocked by the cover member 18. In this case, the cover member 18 may cover the exhaust hole 211c between the third panel 213 and the first panel 211. In this case, since the cover member 18 is protected by the third panel 213, it may be prevented from being damaged by an external force.

A printed layer 214 may be disposed on the second surface 213b of the third panel 213, and the exhaust hole 211c may be disposed to face the printed layer 214. That is, the printed layer 214 of the third panel 213 and the exhaust hole 211c may be disposed to overlap each other in a front and rear direction.

The first panel 211 and the second panel 212 may have the same size. On the other hand, the third panel 213 may have a size greater than that of the first panel 211.

A size relationship between the third panel 213 and the first panel 211 may be the same as the size relationship between the first panel 11 and the second panel 13 described in the first embodiment.

The third panel 213 may also include the first area and the second area, which are described in the first embodiment, by the printed layer 214 of the third panel 213.

The vacuum insulation space 216 between the first panel 211 and the second panel 212 may be sealed by the first sealing member 222.

The second surface 211b of the first panel 211 may include an inclined surface 211d inclined in a direction that is away from the second panel 212 toward an end side thereof.

The first surface 212a of the second panel 212 may include an inclined surface 212c that inclines in a direction that is away from the first panel 211 toward an end side thereof.

The second surface 211b of the first panel 211 and the first surface 212a of the second panel 212 except for the inclined surfaces 211d and 212c may be parallel to each other.

The first sealing member 222 may be disposed not only between the two parallel surfaces, but also may be disposed between the inclined surfaces 211d and 212c.

Thus, the first sealing member 222 may include a first portion disposed between the two parallel surfaces and a second portion extending from the first portion and disposed between the inclined surfaces 211d and 212c.

A thickness of the second portion is greater than that of the first portion. When the thickness of the second part is greater than that of the first part, contact areas between the first sealing member 222 and the first panel 211 and between the first sealing member 222 and the second panel 212 may increase to increase in contact strength by the first sealing member 222, thereby improving sealability.

The third panel 213 may be spaced apart from the first panel 211 by a spacer 224. The spacer 224 may also serve to seal a space between the first panel 211 and the third panel 213.

An insulation space 217 may also be defined between the third panel 213 and the first panel 211. The insulation space 217 may be a vacuum insulation space, an insulation space containing air, or an insulation space into which a gas for insulation (e.g., argon gas) is injected.

If the insulation space 217 between the first panel 211 and the third panel 213 is the vacuum insulation space, an additional exhaust hole may be defined in the first panel 211, and the first panel 211 and the third panel 213 may be spaced apart from each other by a plurality of additional spacers.

A gap between the first panel 211 and the third panel 213 may be less than a thickness of the third panel 213 or the first panel 211.

In this case, at least a portion of the additional spacer may overlap the spacer 221 disposed between the first panel 211 and the second panel 212 in a front and rear direction. As a result, it may be minimized that visibility is deteriorated by the spacers having a plurality of layers.

The gap between the first panel 211 and the third panel 213 may be equal to or greater than that between the first panel 211 and the second panel 212.

The first surface 211a of the first panel 211 may include an inclined surface 211e that moves away from the third panel toward an end thereof. The spacer 224 may be in contact with the inclined surface 211e. Also, the spacer 224 may also be in contact with a side surface of the first panel 211.

Thus, a contact area between the spacer 224 and the first panel 211 and a contact area between the spacer 224 and the third panel 213 may increase.

Figure 16:
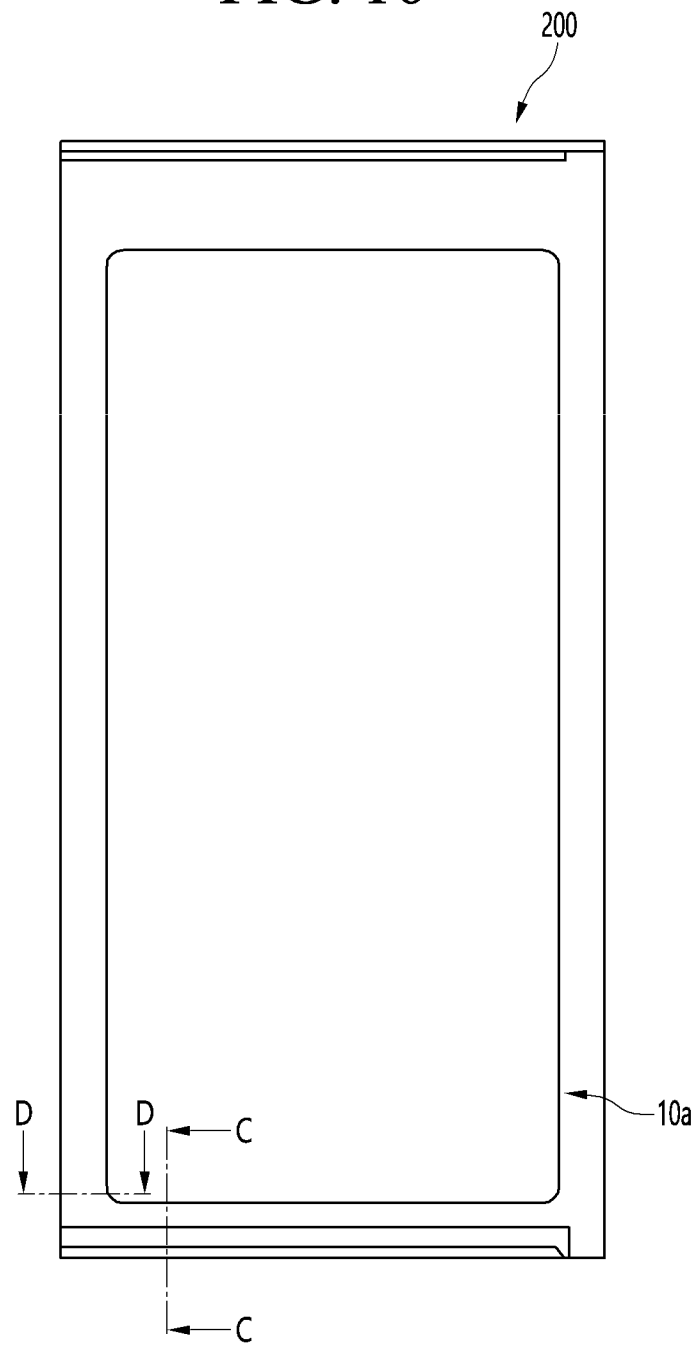
FIG. 16 is a view of a door to which the panel assembly is applied according to the second embodiment of the present invention.
Figure 17:
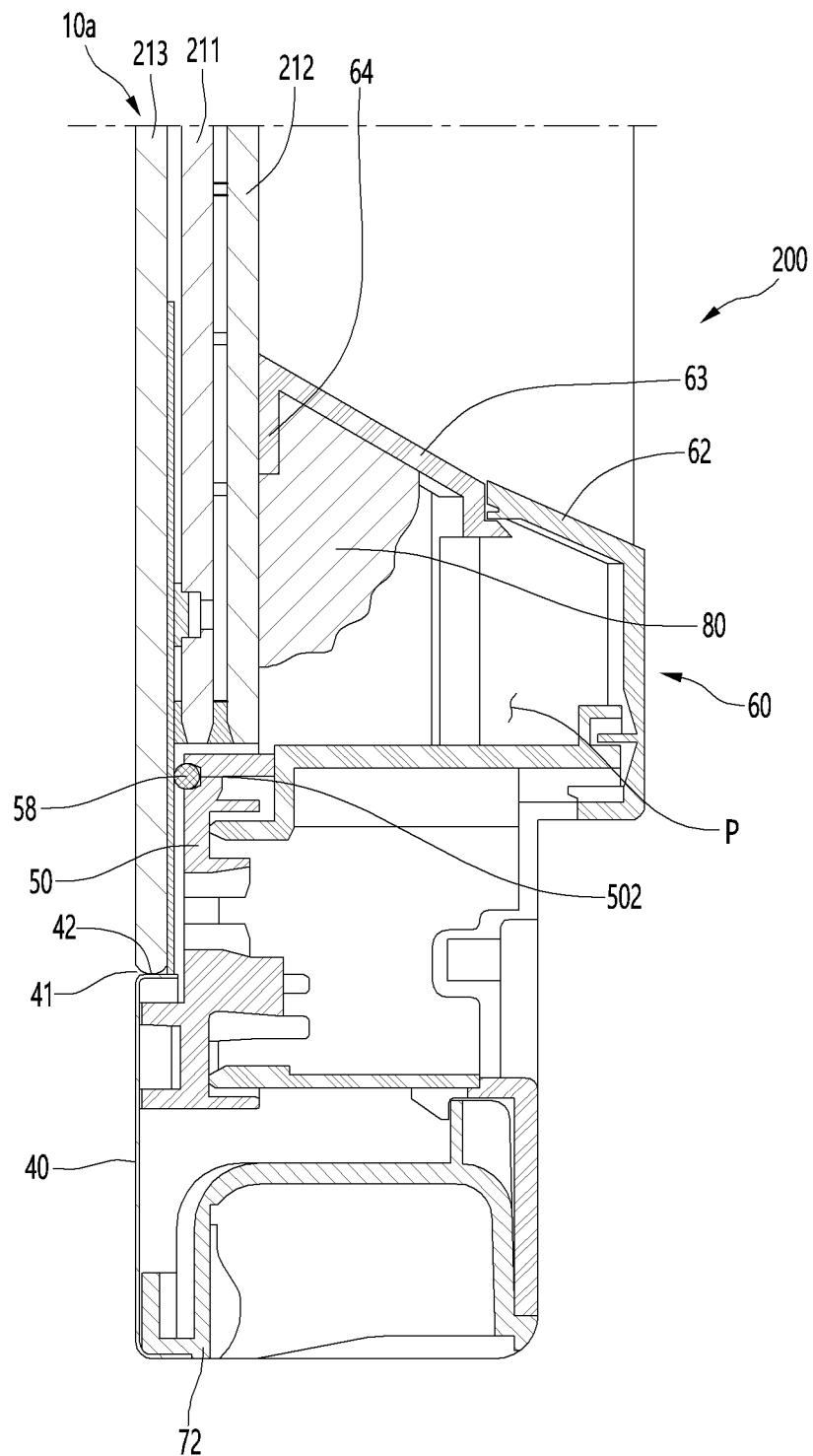
FIG. 17 is a cutaway cross-sectional view taken along line C-C of FIG. 16.
Figure 18:
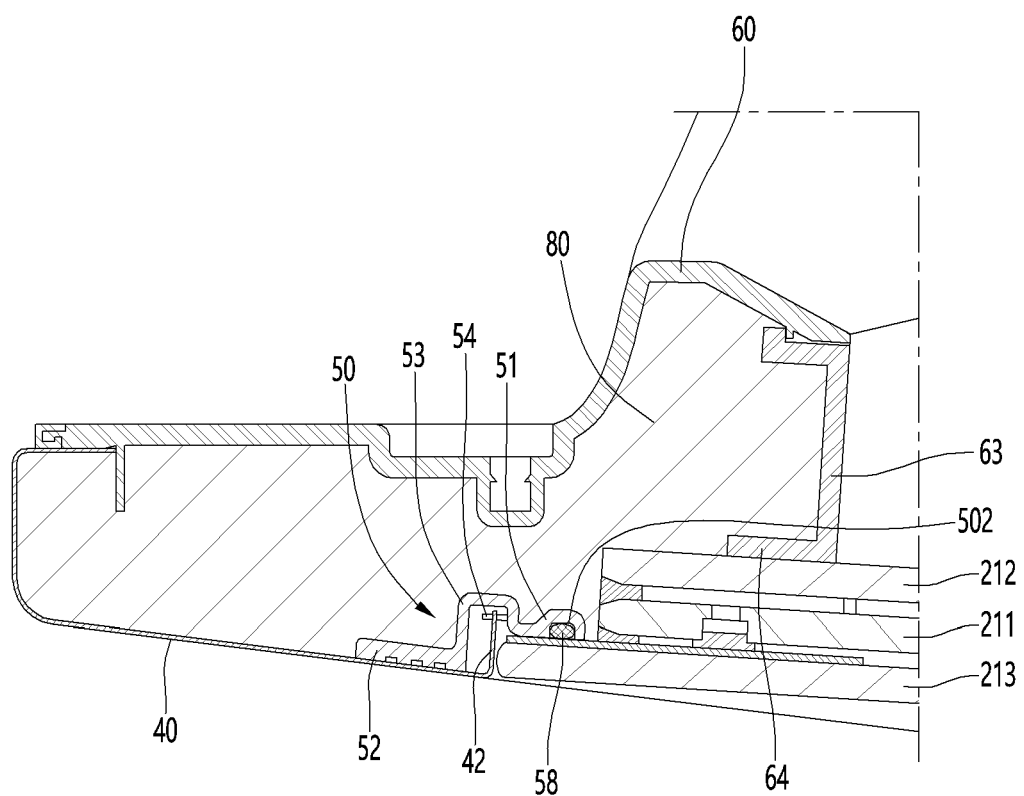
FIG. 18 is a cutaway cross-sectional view taken along line D-D of FIG. 17.

FIG. 16 is a view of a door to which the panel assembly is applied according to the second embodiment of the present invention, FIG. 17 is a cutaway cross-sectional view taken along line C-C of FIG. 16, and FIG. 18 is a cutaway cross-sectional view taken along line D-D of FIG. 17.

Referring to FIGS. 16 to 18, the door 200 according to this embodiment have the same structure as the structure of the door 30 according to the first embodiment except for a structure of a panel assembly 10a, and thus, the same structure is denoted by the same reference numerals, and the description of the first embodiment will be cited.

Thus, the door 200 according to this embodiment may also include a door frame 40 supporting the panel assembly 10a and a door liner 60 connected to the door frame 40. Also, the door 200 may further include a bracket 50.

The door frame 40 may include a first opening 41, and the door liner 60 may include a second opening 61. The panel assembly 10a may cover the first opening 41 and the second opening 61.

The door liner 60 may include a bent portion 62 that is bent from the second opening 61 toward the door frame 40.

The door frame 40 may be provided as a thin plate and may include a bent portion 42 that is bent inward from the first opening 41. An inner region of the bent portion 42 substantially becomes the first opening 41.

The panel assembly 10a may be disposed at the first opening 41 to cover the first opening 41 or may cover the first opening 41 from the outside of the first opening 41.

When the panel assembly 10a is disposed inside the first opening 41, a side surface of the panel assembly 10 may be in contact with the bent portion 42.

For example, the side surface of the third panel 213 may be in contact with the bent portion 42.

The third panel 213 may define a portion of a front appearance of the door 200. That is, the panel assembly 10a may be installed on the door 200 so that the third panel 213 is disposed at the foremost side, and the second panel 212 is disposed at the rearmost side.

A front surface (first surface) of the third panel 213 may define the same surface as a front surface of the door frame 40, or a line passing through the front surface of the third panel 213 may pass through the front surface of the door frame 40. Alternatively, the front surface of the third panel 213 and the front surface of the door frame 40 may be stepped. However, in this case, in order to prevent the third panel 213 from being damaged, the front surface of the third panel 213 may be disposed behind the front surface of the door frame 40.

The bracket 50 may include a first portion 51 disposed to face the third panel 213, a second portion 52 disposed to face the door frame 40, and a third portion 53 connecting the first portion 51 to the second portion 52.

The first portion 51 of the bracket 50 may face a rear surface (second surface) of the third panel 213, and the second portion 52 of the bracket 50 may face a rear surface of the door frame 40.

For example, the first portion 51 of the bracket 50 may be disposed to correspond to the second area (area on which the printed layer is disposed) of the third panel 213. That is, the first portion 51 of the bracket 50 may be disposed to face the second area of the third panel 213.

Thus, even if the panel assembly 10a is installed on the door 200, the bracket 50 may be prevented from being exposed to the outside.

The first portion 51 of the bracket 50 may be provided with a coupling protrusion 54, and the bent portion 42 may be provided with a protrusion slot (not shown) into which the coupling protrusion 54 is inserted.

A heater accommodation groove 502 may be defined in the first portion 51 of the bracket 50. A heater 58 may be accommodated in the heater accommodation groove 502.

In the case of this embodiment, since the panel assembly 10a has a vacuum insulation space, a thickness of the panel assembly may be reduced compared to a structure in which a gas is filled between two panels.

When the panel assembly 10a according to this embodiment is applied to the structure of the existing door 30, a gap between the panel assembly 10a and the bent portion 62 of the door liner 60 may occur by a reduced thickness of the panel assembly 10a.

If, without changing the structure of the existing door liner 60, the panel assembly 10a according to this embodiment is used, the door 30 may further include an intermediate member 63 disposed in a spaced portion between the door liner 60 and the panel assembly 10a.

One side of the intermediate member 63 may be coupled to the door liner 60, and the other side may be in contact with the panel assembly 10. For example, the intermediate member 63 may be in contact with the rear surface (second surface) of the second panel 212.

The intermediate member 63 may further include a contact portion 64 to increase in contact area between the intermediate member 63 and the second panel 212.

As another example, the door liner 60 may be configured to include the same configuration as the intermediate member 63 by changing the structure of the door liner 60. In this case, the door liner 60 may include a contact portion 64 for contacting the second panel 212.

In either case, the door frame 40, the door liner 60, the bracket 50, and the panel assembly 10a may define an insulation space P in which an insulation material 80 is filled.

The contact portion 64 of the door liner 60 may be in contact with a position spaced a predetermined distance from an edge end of the second panel 212.

The insulation material 80 may be in contact with the door frame 40, the door liner 60, and the bracket 50. Also, the insulation material 80 may be in contact with a rear surface (second surface) of the second panel 212. A portion of the insulation material 80 may be in contact with the contact portion 64 to press the contact portion 64 toward the second panel 212. Thus, the insulation material between the contact portion 64 and the second panel 212 may be prevented from leaking.

Since the panel assembly 10a itself includes the vacuum insulation space, thermal insulation performance may be maintained by the vacuum insulation space, but an outer surface of the panel assembly 10a, in particular, the sealing member 222 and the spacer 224 may be capable of the heat conduction, and thus, there is a need to prevent the thermal insulation performance by the heat conduction.

In order to prevent deterioration in thermal insulation performance due to the heat conduction of the panel assembly 10a, the insulation material 80 may be in contact with the rear surface (second surface) of the second panel 212. Also, the insulation material 80 may be in contact with a side surface of the second panel 212, the first sealing member 222, and a portion of the spacer 16.

The insulation material 80 may be disposed to overlap the second panel 212 in a front and rear direction (which may be defined as an arranged direction of the panels). In order to secure the thermal insulation performance, the vertical or horizontal length (overlapping length) D4 of the portion of the second panel 212 overlapping the insulation material 80 in the front and rear direction may be set within a range of 20 mm to 50 mm. The technical meaning of the overlapping length D4 of the insulation material 80 and the second panel 212 in the front and rear direction is the same as described in the first embodiment.

Figure 19:
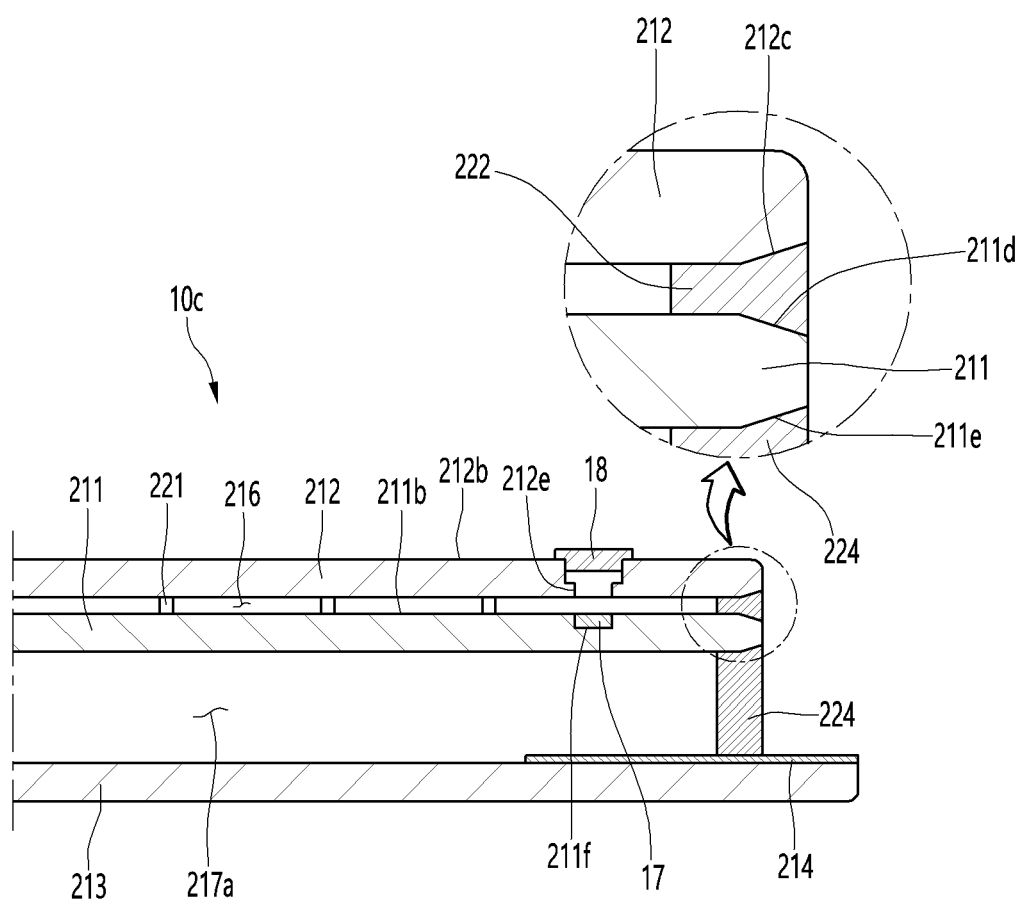
FIG. 19 is a cross-sectional view of a panel assembly according to a third embodiment of the present invention.

FIG. 19 is a cross-sectional view of a panel assembly according to a third embodiment of the present invention.

This embodiment is the same as the second embodiment except that there is a difference in distance between a first panel and a third panel at a position of a getter. Thus, only characterized parts in this embodiment will be described below.

Referring to FIG. 19, a panel assembly 10c according to this embodiment includes a first panel 211, a second panel 212 disposed behind the first panel 211, and a third panel 213 disposed in front of the first panel 211.

The first panel 211 and the second panel 212 are spaced apart from each other by a plurality of spacers 221, and a vacuum insulation space 216 between the first panel 211 and the second panel 212) is defined.

In this embodiment, an exhaust hole 212e may be defined in the second panel 212. The exhaust hole 212e may be covered by the cover member 18. The cover member 18 may cover the exhaust hole 212e at a side of the second surface 212b of the second panel 212.

An accommodation groove 211f in which the getter 17 is accommodated may be defined in the second surface 211b of the first panel 211. The accommodation groove 211f may be disposed to face the exhaust hole 212e. Alternatively, even if the accommodation groove 211f is not disposed to face the exhaust hole 212e, the accommodation groove 211f may be disposed at a position adjacent to the exhaust hole 212e.

A printed layer 214 may be disposed on the second surface 213b of the third panel 213, and the exhaust hole 211c and the getter 17 may be disposed to face the printed layer 214. Thus, the accommodation groove 211f, the getter 17, and the exhaust hole 212e may be prevented from being exposed to the outside by the printed layer 214 provided on the third panel 213.

The first panel 211 and the second panel 212 may have the same size. On the other hand, the third panel 213 may have a size greater than that of the first panel 211.

The third panel 213 may also include the first area and the second area, which are described in the first embodiment, by the printed layer of the third panel 213.

The vacuum insulation space 216 between the first panel 211 and the second panel 212 may be sealed by the first sealing member 222. The second surface 211b of the first panel 211 may include an inclined surface 211d inclined in a direction that is away from the second panel 212 toward an end side thereof.

The first surface 212a of the second panel 212 may include an inclined surface 212c that inclines in a direction that is away from the first panel 211 toward an end side thereof.

The second surface 211b of the first panel 211 and the first surface 212a of the second panel 212 except for the inclined surfaces 211d and 212c may be parallel to each other.

The first sealing member 222 may be disposed not only between the two parallel surfaces, but also may be disposed between the inclined surfaces 211d and 212c.

Thus, the first sealing member 222 may include a first portion disposed between the two parallel surfaces and a second portion extending from the first portion and disposed between the inclined surfaces 211d and 212c.

A thickness of the second portion is greater than that of the first portion. When the thickness of the second part is greater than that of the first part, contact areas between the first sealing member 222 and the first panel 211 and between the first sealing member 222 and the second panel 212 may increase to increase in contact strength by the first sealing member 222, thereby improving sealability.

The third panel 213 may be spaced apart from the first panel 211 by a spacer 224.

An insulation space 217a may also be defined between the third panel 213 and the first panel 211. The insulation space 217a may be an insulation space into which a gas for insulation (e.g., argon gas) is injected.

The first surface 211a of the first panel 211 may include an inclined surface 211e that moves away from the third panel toward an end thereof. The spacer 224 may be in contact with the inclined surface 211e. Also, the spacer 224 may also be in contact with a side surface of the first panel 211. Thus, a contact area between the spacer 224 and the first panel 211 and a contact area between the spacer 224 and the third panel 213 may increase.

A gap between the first panel 211 and the third panel 213 may be larger than a gap between the first panel 211 and the second panel 212.

Figure 20:
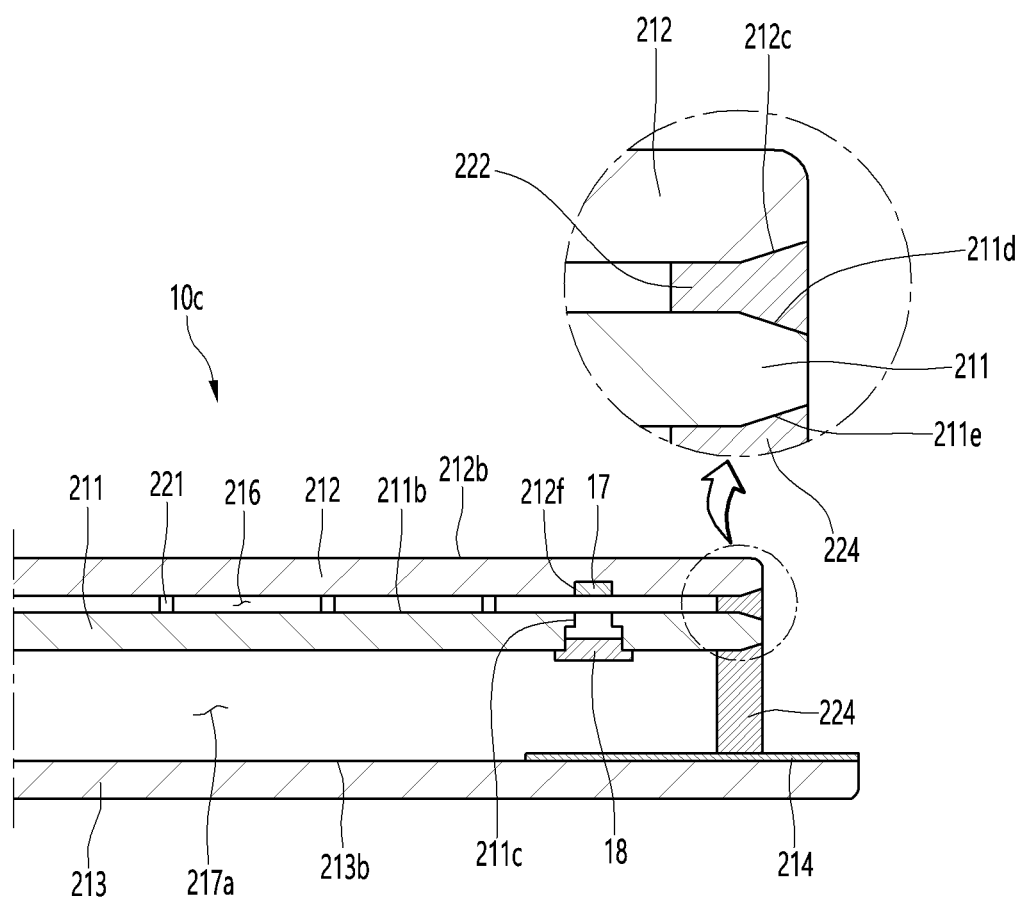
FIG. 20 is a cross-sectional view of a panel assembly according to a fourth embodiment of the present invention.

FIG. 20 is a cross-sectional view of a panel assembly according to a fourth embodiment of the present invention.

This embodiment is the same as the third embodiment except for a position of a getter and a position of an exhaust hole. Thus, only characterized parts in this embodiment will be described below.

Referring to FIG. 20, in case of a panel assembly 10c according to this embodiment, an exhaust hole 211c may be defined in a first panel 211, and an accommodation groove 212f in which a getter 17 is accommodated may be defined in a second panel 212.

The accommodation groove 212f may be disposed to face the exhaust hole 211c. Alternatively, even if the accommodation groove 212f is not disposed to face the exhaust hole 211c, the accommodation groove 212f may be disposed at a position adjacent to the exhaust hole 211c.

A printed layer 214 may be disposed on the second surface 213b of the third panel 213, and the exhaust hole 211c and the getter 17 may be disposed to face the printed layer 214. Thus, the accommodation groove 212f, the getter 17, and the exhaust hole 211c may be prevented from being exposed to the outside by the printed layer 214 provided on the third panel 213.

Figure 21:
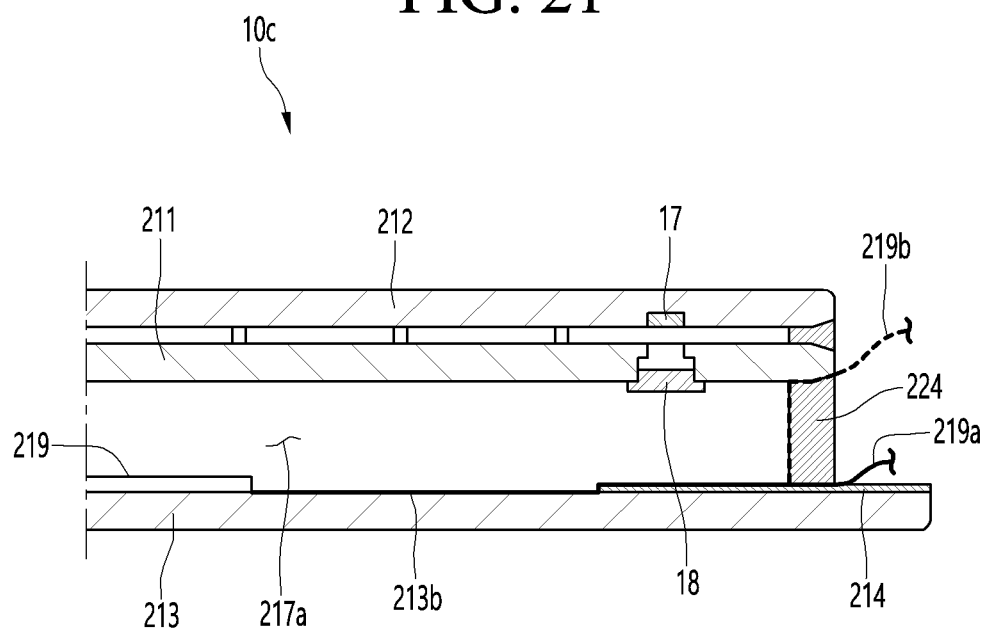
FIG. 21 is a view illustrating another example of FIG. 20.

FIG. 21 is a view illustrating another example of FIG. 20.

Contents of the display of FIG. 21 may be equally applied to the structure of FIG. 19.

Referring to FIG. 21, the panel assembly 10c may further include a display 219. The display 219 may be an LCD or an LED.

The display 219 may be disposed behind, for example, the third panel 213. The display 219 may be disposed in a space 217a between the first panel 211 and the third panel 213. The display 219 may be installed on a rear surface of the third panel 213.

A signal cable 219a may be connected to the display 219. The signal cable 219a may pass between the spacer 224 and the printed layer 214 and may be drawn out of the panel assembly 10c. As another example, a signal cable 219b connected to the display 219 may pass between the spacer 224 and the front surface of the first panel 211.

Figure 22:
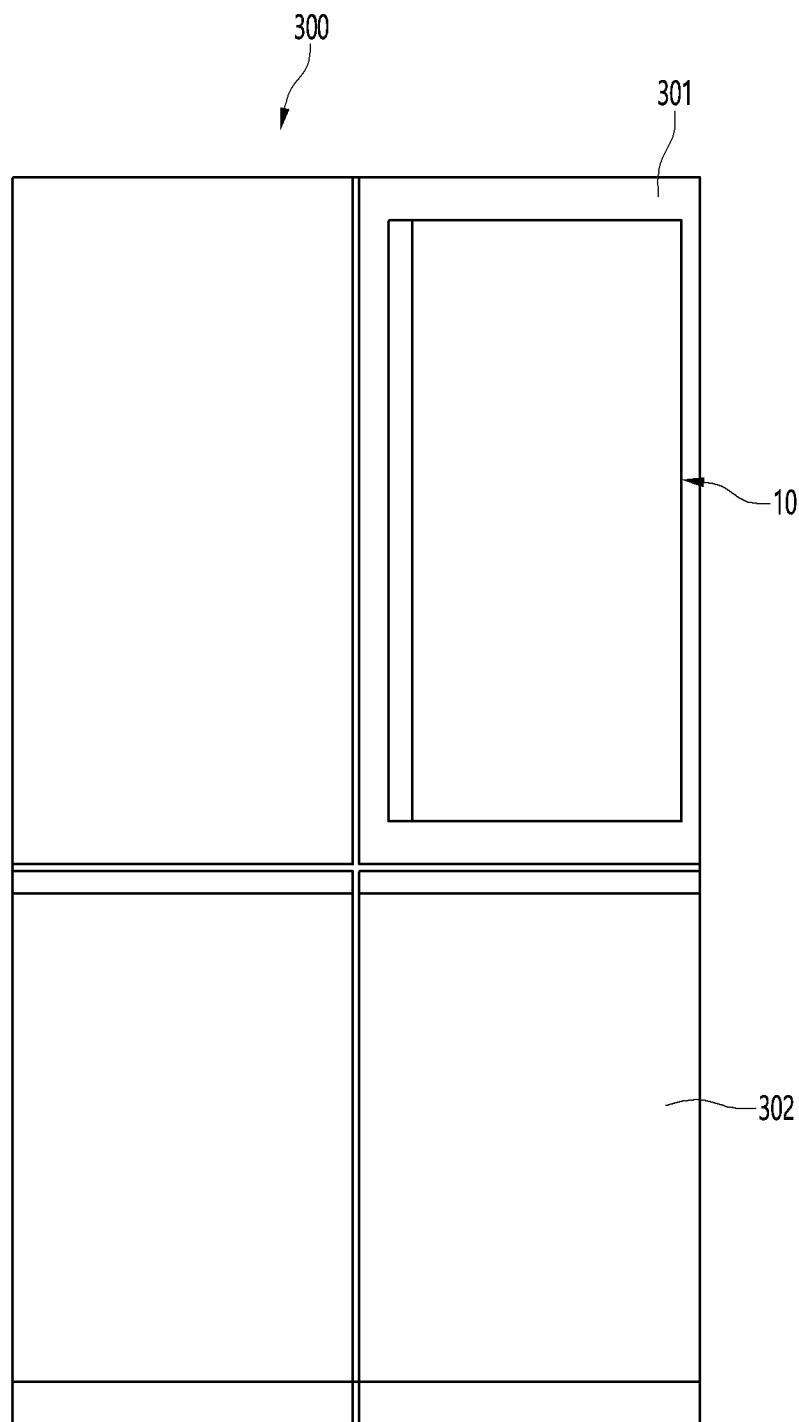
FIG. 22 is a view of a door to which the panel assembly is applied to a refrigerator according to the first embodiment of the present invention.
Figure 23:
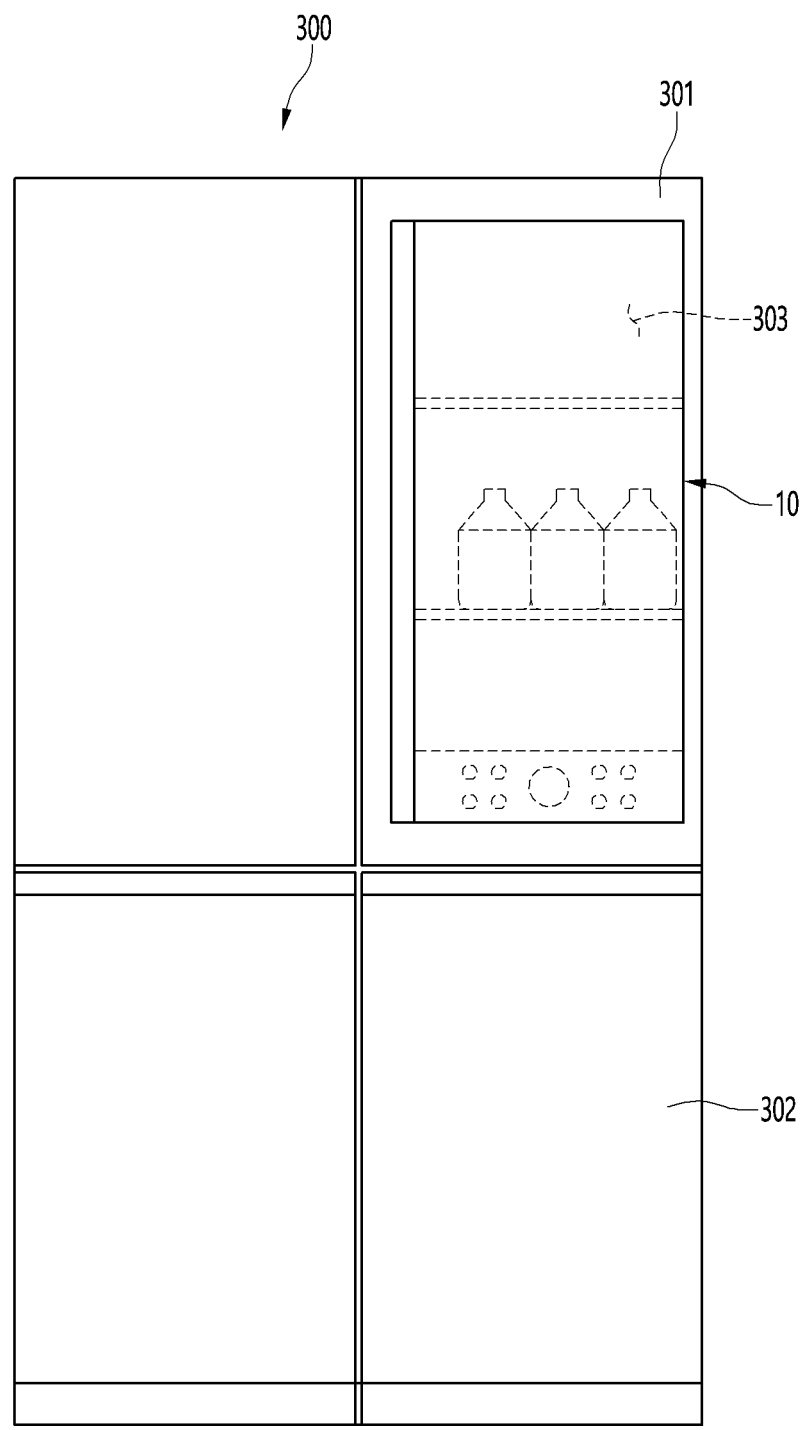
FIG. 23 is a view of a state in which a door lighting unit is turned on in the refrigerator of FIG. 22.
Figure 24:
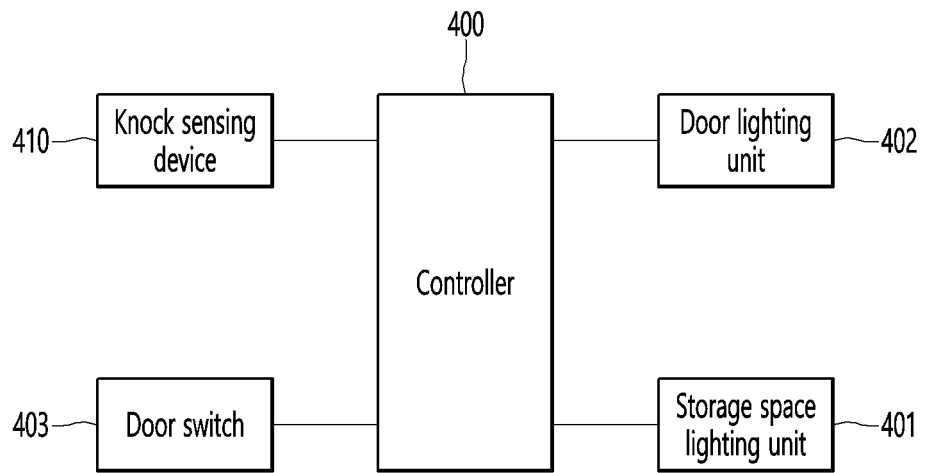
FIG. 24 is a block diagram of the refrigerator of FIG. 22.

FIG. 22 is a view of a door to which the panel assembly is applied to the refrigerator according to the first embodiment of the present invention, FIG. 23 is a view of a state in which a door lighting unit is turned on in the refrigerator of FIG. 22, and FIG. 24 is a block diagram of the refrigerator of FIG. 22.

Referring to FIGS. 22 to 24, a refrigerator 300 to which the panel assembly 10 according to this embodiment is applied may include a cabinet defining a storage space and doors 301 and 302 for opening and closing the storage space.

FIGS. 22 to 24 illustrate the panel assembly 10 according to the first embodiment, but it should be noted that the panel assemblies of the second to fourth embodiments described above may be applied to the refrigerator 300 in the same manner.

One or more doors 301 and 302 may open and close the storage space. Alternatively, the storage space may be divided into a refrigerating compartment and a freezing compartment, one door 301 may open and close the refrigerating compartment, and the other door 302 may open and close the freezing compartment.

The panel assembly 10 may be provided on the door 301.

Since a structure of the door 301 is the same as the structure of the door 30 described in FIG. 9, a detailed description thereof will be omitted.

The door 301 may include a door storage space 303 in which foods are stored. The door storage space 303 may be a space defined by a basket coupled to the door 301, a space defined between a plurality of baskets, or a space defined by a separate accommodation case.

The refrigerator 300 may include a door switch 403 for sensing the opening of the door 301, a storage space lighting unit 401 that irradiates light to the storage space of the cabinet, and a controller 400 that controls the storage space lighting unit 401.

The controller 400 may be turned on the storage space lighting unit 401 when the door switch 403 senses the opening of the door. When the storage space lighting unit 401 is turned on, a user may easily check the foods stored in the storage space.

The refrigerator 300 may further include a knock sensing device 410 for sensing a knock input to the panel assembly 10 and a door lighting unit 402 for irradiating light so that the door storage space 303 is seen from the outside.

When it is determined that the knock sensing device 410 senses a normal knock input, the controller 400 may turn on the door lighting unit 402. That is, the door lighting unit 402 may be turned on in a state in which the door 30 is not opened.

For example, when the normal knock input is sensed, it may be a case that two knock inputs are sensed for a predetermined time.

As illustrated in FIG. 22, when the door lighting unit 402 is turned off, the door storage space 303 is not visible from the outside in front of the door 301. On the other hand, when the door lighting unit 402 is turned on, as illustrated in FIG. 20, the door lighting unit 402 may irradiate light to the door storage space 303, and some light sequentially pass through the panels of the panel assembly 10.

Since light passes through the panel assembly 10, the user may check the inside of the door storage space 303 from the outside of the door 301.

When it is determined that the knock sensing device 410 senses a normal knock input, the controller 400 may turn on the storage space lighting unit 401.

Alternatively, when the door lighting unit 402 is not provided in the door 301, if it is determined that the normal knock input is sensed by the knock sensing device 410, the storage space lighting unit 401 may be turned on. Even when the storage space lighting unit 401 is turned on, the light irradiated from the storage space lighting unit 401 may pass through the panel assembly 10 to confirm the inside of the door storage space 303 from the outside of the door 301.

In the panel assembly 10, light sequentially passes through the second panel 13 and the first panel 11. As described above, the first panel 11 is divided into a first area 111 and a second area 112. Here, the first area 111 is a viewing area through which light is transmitted, and the second area 112 is a non-viewing area through which the transmission of light is restricted.

Figure 25:
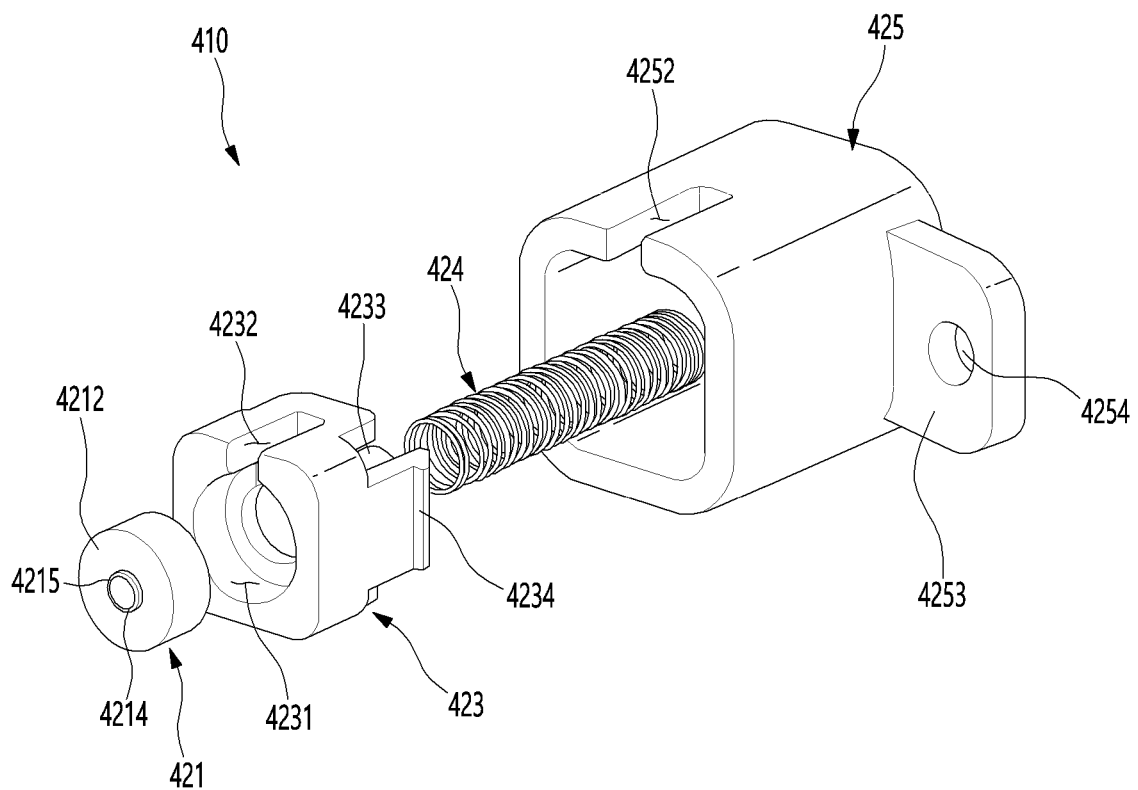
FIG. 25 is an exploded perspective view of a knock sensing device according to an embodiment of the present invention.
Figure 26:
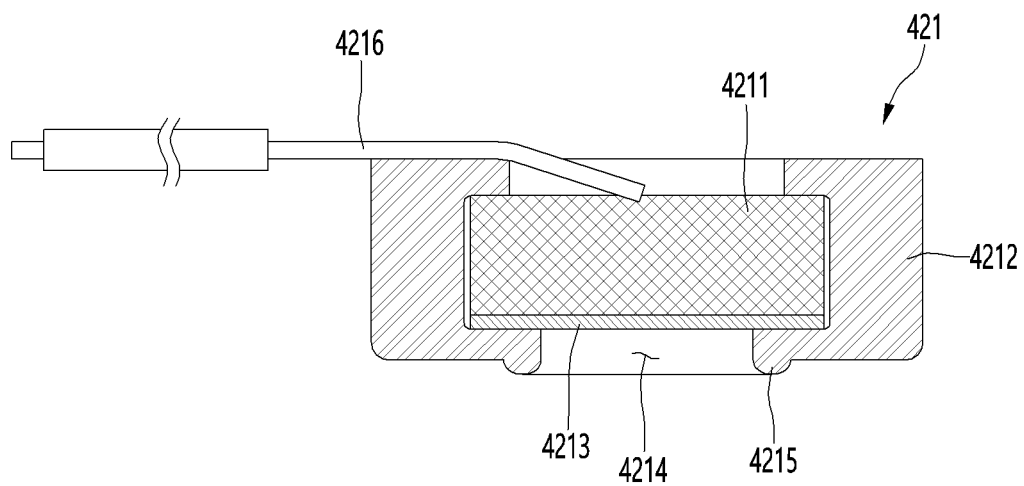
FIG. 26 is a cross-sectional view of a microphone module according to an embodiment of the present invention.
Figure 27:
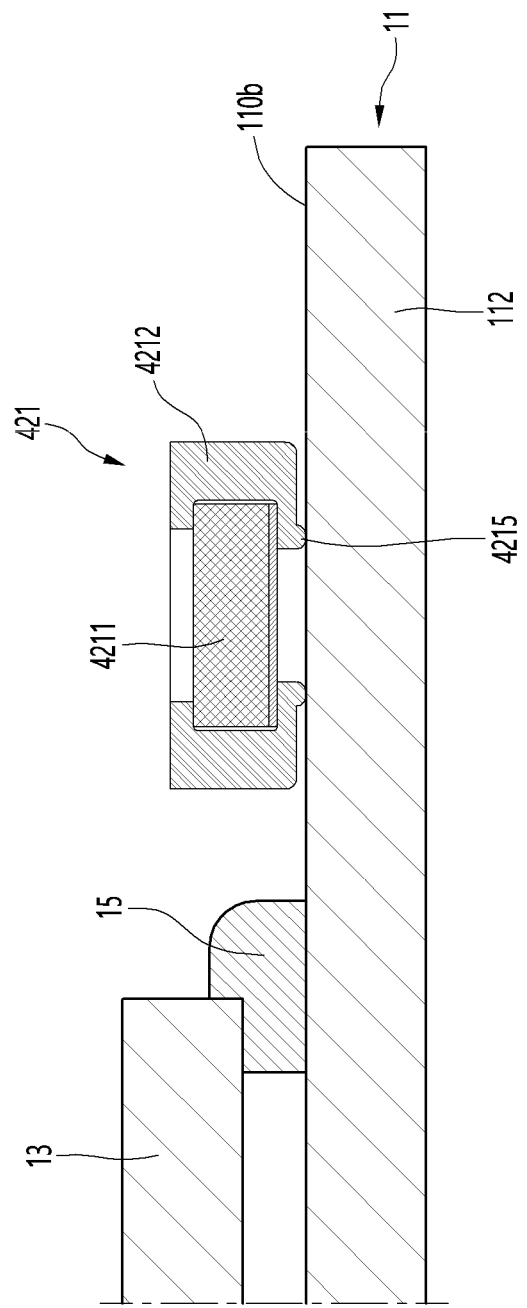
FIG. 27 is a view illustrating a state in which the microphone module is in contact with a panel assembly according to an embodiment of the present invention.
Figure 28:
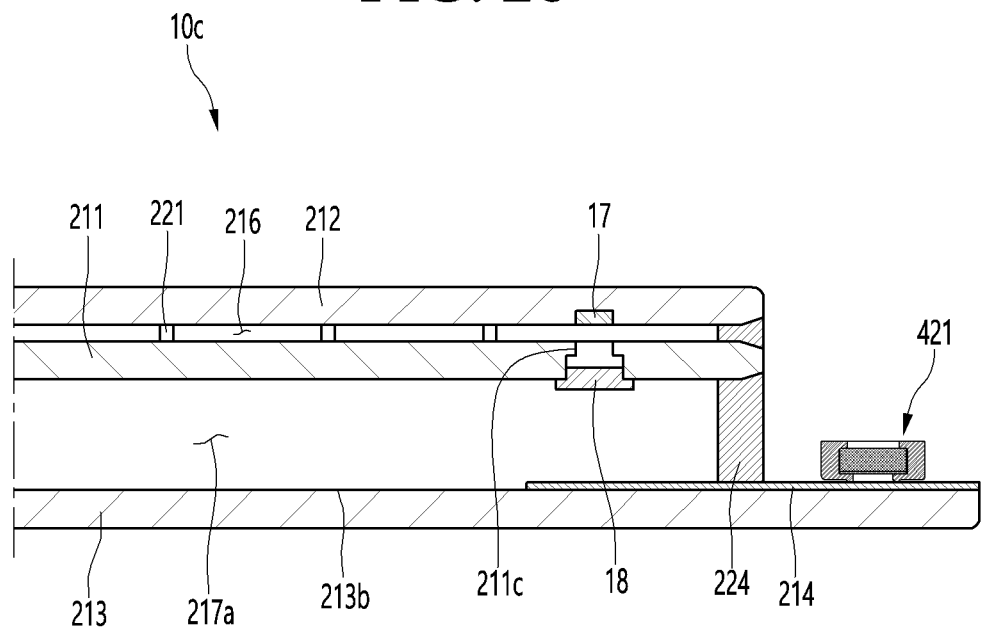
FIG. 28 is a view of a state in which the microphone module is in contact with the panel assembly of FIG. 20.

FIG. 25 is an exploded perspective view of a knock sensing device according to an embodiment of the present invention, FIG. 26 is a cross-sectional view of a microphone module according to an embodiment of the present invention, and FIG. 27 is a view illustrating a state in which the microphone module is in contact with a panel assembly according to an embodiment of the present invention. FIG. 28 is a view of a state in which the microphone module is in contact with the panel assembly of FIG. 20.

Referring to FIGS. 25 to 28, a knock sensing device 410 according to this embodiment is a device for sensing a knock input of a panel assembly 10 by a user.

The knock sensing device 410 may include a microphone module 421 that senses a knock input.

The knock sensing device 410 may further include a holder 423 in which the microphone module 421 is accommodated, an elastic member 424 pressing the holder 423 and the microphone module 421 toward the panel assembly 10, and a support member 425 supporting the elastic member 424 and the holder 423.

The microphone module 421 may include a microphone 4211 that directly senses sound waves and a microphone accommodation portion 4212 that accommodates the microphone 4211.

The microphone 4211 directly senses the sound waves and is provided in a circular shape having a predetermined thickness so as to be fixed and mounted inside the microphone accommodation portion 4212.

The microphone 4211 may include a sound wave receiving portion 4213 for receiving the sound waves, and the sound wave receiving portion 4213 may be disposed to face an opening 4214 of the microphone accommodation portion 4212. The sound wave receiving portion 4213 may be disposed at one side of the microphone 4211.

A signal line 4216 may be connected to the other side of the microphone 4211, and the signal line 4216 may be directly or indirectly connected to the controller 400.

The microphone accommodation portion 4212 is made of an elastic material such as rubber. For example, the microphone accommodation portion 4212 may be in contact with a rear surface 110b of the first panel 11 in the panel assembly 10.

In practice, since a printed layer 114 may be present on the rear surface 110b of the first panel 11 in the panel assembly 10, the microphone accommodation portion 4212 may be described as being in contact with the printed layer 114.

Since a second area 112 of the first panel 11 is defined by the printed layer 114, the microphone accommodation portion 4212 may be described as being in contact with a second area 112 of the first panel 11.

The microphone accommodation portion 4212 may have an opening 4214 defined in one side adjacent to the microphone 4211 mounted inside the microphone accommodation portion 4212, and a circular protrusion 4215 may be provided around the opening 4214. Thus, the protrusion 4215 may be in close contact with the first panel 11.

In a state in which the microphone accommodation portion 4212 and the first panel 11 are in close contact with each other by the protrusion 4215, a sealed predetermined space may be defined between the opening 4214 and the sound wave receiving portion 4213.

Thus, a front side of the contact space may be sealed by a medium, that is, the first panel 11. Thus, vibration transmitted through the inside of the medium may allow air to vibrate in a predetermined space, and a sound wave caused by the vibration may be received by the microphone 4211.

Due to this sealing, it may be possible to minimize introduction of external noise or vibration into the predetermined space. This may significantly reduce errors in knock input determination and a malfunction due to the external noise to improve a recognition rate of the knock input.

The holder 423 accommodates the microphone module 421, and a module seating portion 4231 opened toward the first panel 11 may be provided. In a state in which the microphone module 421 is seated on the module seating portion 4231, at least the protrusion 4215 may protrude further forward than a front surface of the holder 423.

The holder 423 may have a holder slot 4232 through which the signal line connected to the microphone 4211 enters and exits. The holder slot 4232 may be opened at one side of the module mounting portion 4231.

Also, a first elastic member fixing portion 423 may be provided on a rear surface of the holder 423 to protrude so that the elastic member 424 is fixedly mounted. The first elastic member fixing portion 423 may extend to pass through one end of the coil-shaped elastic member 424.

A holder coupling portion 4234 having a hook shape and coupled to the support member 425 may be provided at each of both sides of the holder 423. The holder 423 may be coupled to the support member 425 by the holder coupling portion 4234.

Due to the hook shape of the holder coupling portion 4234, movement of the holder 423 in an insertion direction toward the inside of the support member 425 may not be restricted by the hook shape of the holder coupling portion 4234. The support member 425 is provided so that a front surface thereof is opened, and the holder 423 may be inserted through the opened front surface.

A second elastic member fixing portion (not shown) protruding so that the elastic member 424 is fixedly mounted may be disposed inside the holder 423. The second elastic member fixing portion may be disposed on the same extension line as the first elastic member fixing portion 423 and be accommodated inside the elastic member 424.

The microphone module 421 may be maintained in the state of being in close contact with the first panel 11 by the elastic member 424. Particularly, the microphone module 421 may be remained in the state of being in close contact with the first panel 11 without changing a position thereof even due to an impact generated when the door 301 is opened or closed or due to an inertia during rotation of the door 301.

A support member slot 4252 may be defined in one side of the support member 425. The support member slot 4252 may be defined in the same extension line as the holder slot 4232. Thus, a signal line passing through the holder slot 4242 may pass through the support member slot 4252.

A support member fixing portion 4254 may be disposed on the other side of the support member 425. The support member fixing portion 4254 may be provided to extend outward and be fixed to the door frame 40 or the connection members 70 and 72 or may be fixed to a separate case coupled to the door frame 40 or the connection members 70 and 72.

Referring to FIG. 28, when the panel assembly 10c additionally includes a third panel 213, the microphone module 421 may be disposed on an area corresponding to the printed layer 214 of the third panel 213. For example, the microphone module 421 may be in contact with the printed layer 214 of the third panel 213.

Figure 29:
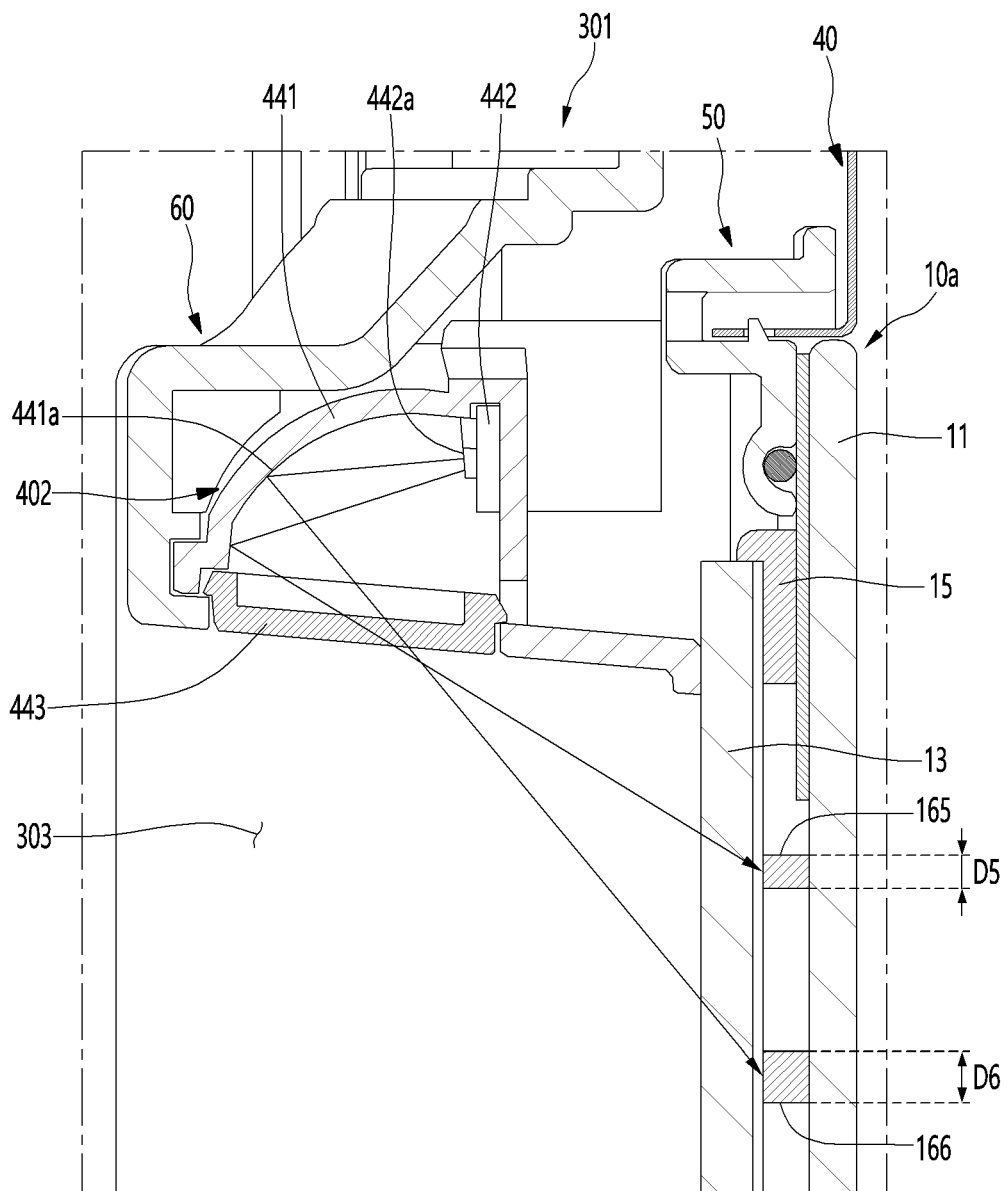
FIG. 29 is a cross-sectional view illustrating a state in which a door lighting unit is installed on a door according to an embodiment of the present invention.

FIG. 29 is a cross-sectional view illustrating a state in which the door lighting unit is installed on a door according to an embodiment of the present invention.

Referring to FIG. 29, the door lighting unit 402 may be installed on the door liner 60.

The door lighting unit 402 may include a case 441 and a cover 443 covering the case 411.

The cover 443 may extend lengthily in a horizontal direction along the door liner 60. The case 441 defines a space for accommodating a light emitting unit PCB 422 in which a plurality of light emitting units 442a are installed.

In the case 441, a surface facing the light emitting unit PCB 442 may be round, and light irradiated from the light emitting unit 442a may be reflected through a rounded surface 441a having a predetermined curvature to travel toward the cover 443.

A film for improving reflectance of light may be attached, or a coating layer may be disposed on the rounded surface 441a.

The cover 443 may be provided so that the light reflected from the rounded surface 441a is transmitted. The cover 443 may be transparent or translucent so that light reflected and spread from the round surface 441a is transmitted. Therefore, the light passing through the cover 433 illuminates the door storage space in an indirect lighting manner and has the same effect as surface light emission.

The cover 443 may be attached with the film or coated to diffuse the light more effectively.

A portion of the light passing through the cover 443 may be irradiated to an auxiliary storage space 303, and the other portion may be irradiated toward the second panel 13. The light irradiated toward the second panel 13 may pass through the first panel 11 after passing through the second panel 13.

When the first panel 11 defines an outer appearance of the refrigerator, the knock sensing device 410 may be in contact with the first panel 11. As another embodiment, when the third panel 213 defines an outer appearance of the refrigerator, the knock sensing device 410 may be in contact with the third panel 213.

The door lighting unit 402 may be disposed to be biased to either side of the door 301, or a plurality of door lighting units 402 may be disposed to be symmetrical to each other in the door 301.

In any case, some of the spacers 165 may be disposed closer to the door lighting unit 402 than other spacers 166 based on the plurality of spacers 16.

As illustrated in FIG. 29, an amount of light or an intensity of light reaching to the spacer 165 disposed close to the door lighting unit 402 may be greater than an amount of light or an intensity of light reaching the spacer 166 disposed far from the door lighting unit 402.

In views of visibility of the inner space of the home appliance, since it is preferable to minimize that the spacers 165 and 166 are exposed to the outside, a diameter (or size) D5 of one spacers 165 disposed close to the door lighting unit 402) may be less than a diameter (or size) D6 of the other spacer 166 disposed away from the door lighting unit 402.

Figure 30:
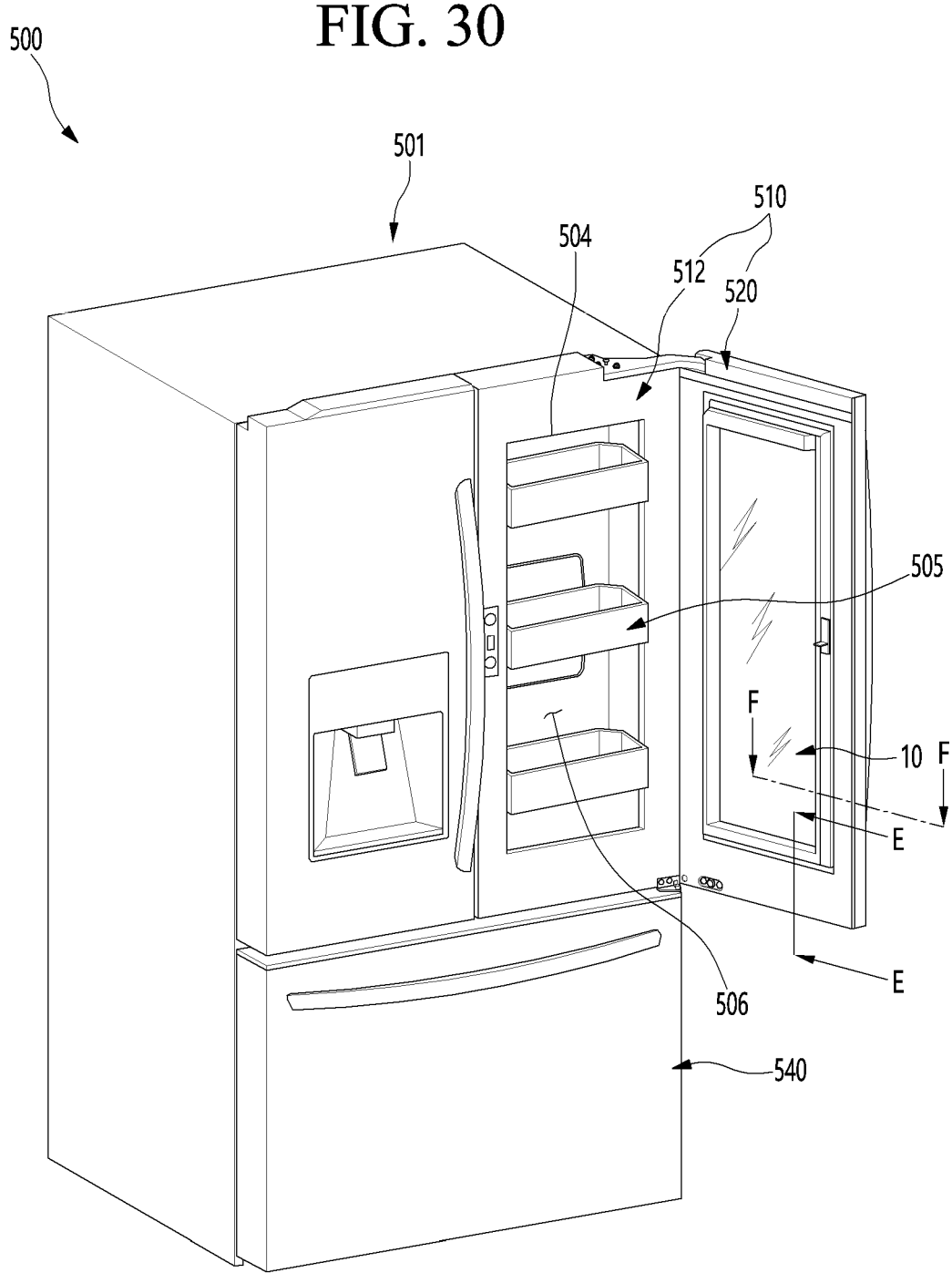
FIG. 30 is a view illustrating another example in which the panel assembly is applied to the refrigerator according to the present invention.
Figure 31:
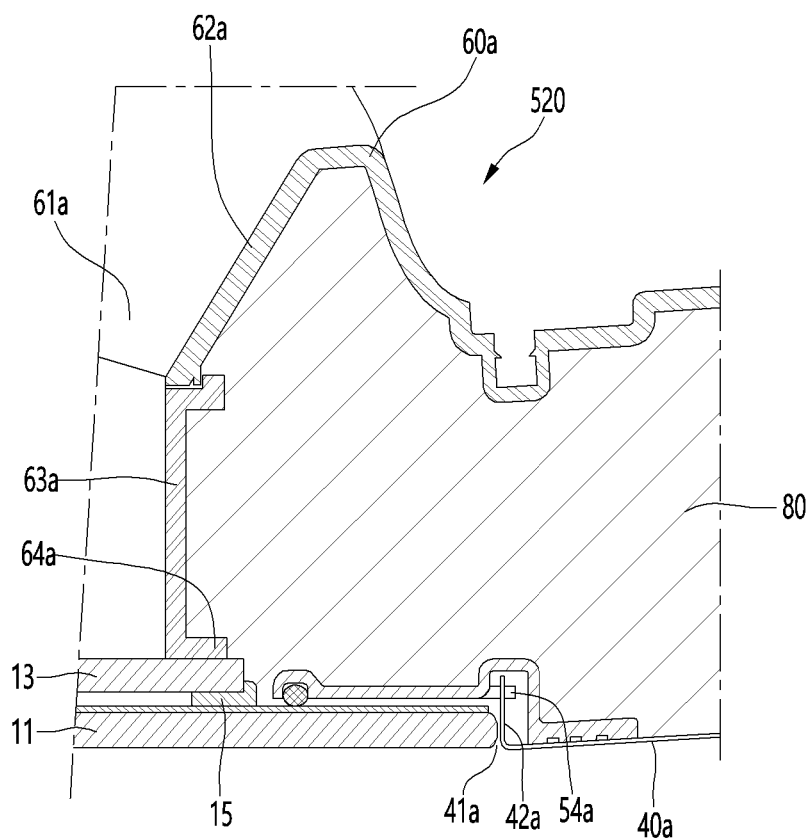
FIG. 31 is a cutaway cross-sectional view taken along line E-E of FIG. 30.

FIG. 30 is a view illustrating another example in which the panel assembly is applied to the refrigerator according to the present invention. FIG. 31 is a cutaway cross-sectional view taken along line E-E of FIG. 30, FIG. 32 is a sectional view taken along line F-F of FIG. 30, and FIG. 33 is an enlarged view of a portion B of FIG. 32.

Figure 32:
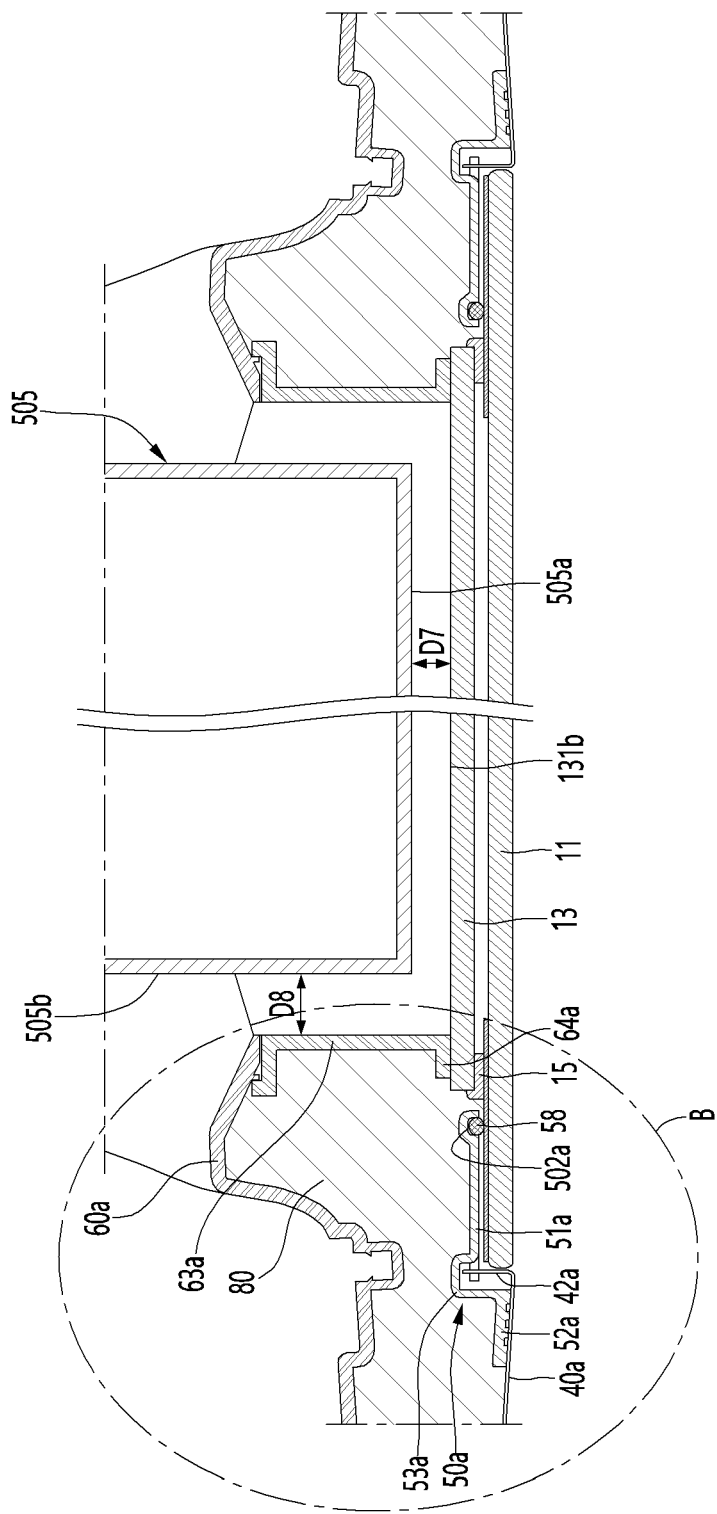
FIG. 32 is a sectional view taken along line F-F of FIG. 30.
Figure 33:
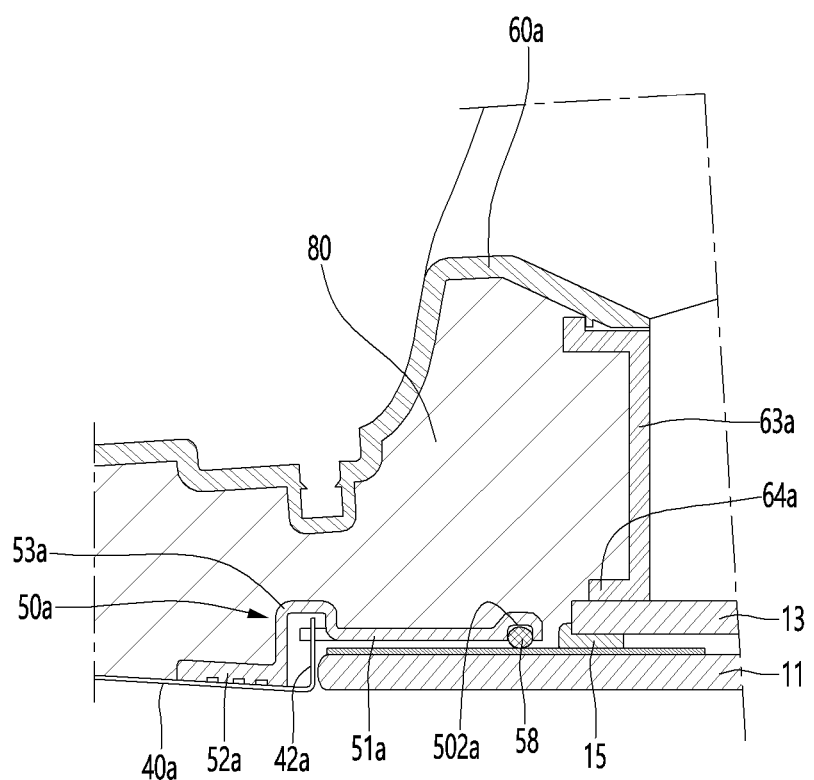
FIG. 33 is an enlarged view of a portion B of FIG. 32.

FIG. 32 illustrates a positional relationship between a basket 505 and a second door 520 provided in a first door 512.

Referring to FIGS. 30 to 33, a refrigerator 500 according to this embodiment may include a cabinet 501 including a storage space and a plurality of doors 510 and 540 for opening and closing the storage space.

The storage space may include a refrigerating compartment and a freezing compartment, and the plurality of doors 510 and 540 may include a refrigerating compartment door 510 and a freezing compartment door 540.

For example, in this embodiment, the refrigerating compartment may be disposed above the freezing compartment.

The refrigerating compartment may be opened and closed by one or a plurality of refrigerating compartment doors 510. In FIG. 30, as an example, two refrigerator compartment doors 510 are opened and closed as the refrigerator compartment door.

The freezing compartment may be opened and closed by one or more freezing compartment doors 540.

The refrigerating compartment door 510 may include a first door 512 that opens and closes the refrigerating compartment and a second door 520 that is rotatable with respect to the first door 512.

The first door 512 may include an opening 504 and a door storage space 506. The door storage space 506 may be an inner space of the basket 505, a space disposed between a plurality of baskets 505, or a space defined by a separate case.

The second door 520 may open and close the opening 504. The second door 520 may include a panel assembly 10. The panel assembly 10 may cover at least a portion of the opening 504.

FIGS. 30 to 32 illustrate that the second door 520 includes the panel assembly 10 according to the first embodiment, but it should be noted that the panel assemblies of the second to fourth embodiments described above may be applied to the second door 520 in the same manner.

The second door 520 may include a door frame 40a supporting the panel assembly 10a and a door liner 60a connected to the door frame 40a. Also, the second door 520 may further include a bracket 50a.

Fundamental functions of the door frame 40a, the door liner 60a, and the bracket 50a may be the same as or similar to those mentioned in the first embodiment.

The door frame 40a may include a first opening 41a, and the door liner 60a may include a second opening 61a. The panel assembly 10 may cover the first opening 41a and the second opening 61a.

The door liner 60a may include a bent portion 62a that is bent from the second opening 61a toward the door frame 40a. Alternatively, the door liner 60a may include a bent portion 62a extending toward the first opening 41a, and the bent portion 62a may define the second opening 61a.

The door frame 40a may be provided as a thin plate and may include a bent portion 42a that is bent inward from the second opening 41a. An inner region of the bent portion 42a substantially becomes the second opening 41a.

The panel assembly 10 may be disposed at the second opening 41a to cover the second opening 41a or may cover the second opening 41a from the outside of the second opening 41a.

A side surface of the panel assembly 10 may be in contact with the bent portion 42a. For example, the side surface of the first panel 11 may be in contact with the bent portion 42a.

The first panel 11 may define a portion of the front appearance of the second door 520. A front surface (first surface) of the first panel 11 may define the same surface as a front surface of the door frame 40a, or a line passing through the front surface of the first panel 11 may pass through the front surface of the door frame 40a. Alternatively, the front surface of the first panel 11 and the front surface of the door frame 40a may be stepped. However, in this case, in order to prevent the first panel 11 from being damaged, the front surface of the first panel 11 may be disposed behind the front surface of the door frame 40a.

The bracket 50a may include a first portion 51a disposed to face the first panel 11, a second portion 52a disposed to face the door frame 40a, and a third portion 53a connecting the first portion 51a to the second portion 52a.

The first portion 51a of the bracket 50a may face a rear surface (second surface) of the first panel 11, and the second portion 52a of the bracket 50a may face a rear surface of the door frame 40a.

For example, the first portion 51a of the bracket 50a may be disposed to correspond to the second area of the first panel 11. That is, the first portion 51a of the bracket 50a may be disposed to face the second area of the first panel 11.

Thus, even if the panel assembly 10 is installed on the second door 520, the bracket 50a may be prevented from being exposed to the outside.

The first portion 51a of the bracket 50a may be provided with a coupling protrusion 54a, and the bent portion 42a may be provided with a protrusion slot (not shown) into which the coupling protrusion 54a is inserted.

A heater accommodation groove 502a may be defined in the first portion 51a of the bracket 50a. A heater 58 may be accommodated in the heater accommodation groove 502a.

In the case of this embodiment, since the panel assembly 10 has a vacuum insulation space, a thickness of the panel assembly may be reduced compared to a structure in which a gas is filled between two panels.

When the panel assembly 10 according to this embodiment is applied to the structure of the existing second door 520, a gap between the panel assembly 10 and the bent portion 62a of the door liner 60a may occur by a reduced thickness of the panel assembly 10.

If, without changing the structure of the existing door liner 60a, the panel assembly 10 according to this embodiment is used, the second door 520 may further include an intermediate member 63a disposed in a spaced portion between the door liner 60a and the panel assembly 10.

One side of the intermediate member 63a may be coupled to the door liner 60a, and the other side may be in contact with the panel assembly 10. For example, the intermediate member 63a may be in contact with the rear surface (second surface) of the second panel 13.

The intermediate member 63a may further include a contact portion 64a to increase in contact area between the intermediate member 63a and the second panel 13.

As another example, the door liner 60a may be configured to include the same configuration as the intermediate member 63a by changing the structure of the door liner 60a. In this case, the door liner 60a may include a contact portion 64a for contacting the second panel 13.

In either case, the door frame 40, the door liner 60, the bracket 50, and the panel assembly 10 may define an insulation space in which an insulation material 80 is filled.

The contact portion 64a of the door liner 60a may be in contact with a position spaced a predetermined distance from an edge end of the second panel 13.

The insulating material 80 may be in contact with the door frame 40a, the door liner 60a, and the bracket 50a. Also, the insulation material 80 may be in contact with a rear surface (second surface) of the second panel 13. A portion of the insulating material 80 may be in contact with the contact portion 64a to press the contact portion 64a toward the second panel 13. Thus, the insulation material may be prevented from leaking between the contact portion 64a and the second panel 13.

Since the panel assembly 10a itself includes the vacuum insulation space, thermal insulation performance may be maintained by the vacuum insulation space, but an outer surface of the panel assembly 10a, in particular, the sealing member 222 may be capable of the heat conduction, and thus, there is a need to prevent the thermal insulation performance by the heat conduction.

In order to prevent deterioration in thermal insulation performance due to the heat conduction of the panel assembly 10, the insulation material 80 may be in contact with the rear surface (second surface) of the second panel 13. Also, the insulation material 80 may be in contact with a side surface of the second panel 13 and a portion of the sealing member 15.

The insulation material 80 may be disposed to overlap the second panel 13 in a front and rear direction (which may be defined as an arranged direction of the panels). In order to secure the thermal insulation performance, an overlapping length D4 of the insulation material 80 and the second panel 13 in a front and rear direction may be set within a range of 20 mm to 50 mm. The technical meaning of the overlapping length D4 of the insulation material 80 and the second panel 13 in the front and rear direction is the same as described in the first embodiment.

Also, it is noted that the configuration and functions for transmitting light through the panel assembly by turning on the lighting unit by sensing the knock input described above may be applied to this refrigerator in the same manner.

As described above, if a thickness of the panel assembly 10 decreases, a size of the basket 505 may increase. When the size of the basket 505 increases, a volume of the door storage space defined by the basket 505 may increase.

For example, a portion of the basket 505 may pass through the opening 504 to protrude forward from a front surface of the first door 512. As described above, even if the front surface of the basket 505 protrudes from the first door 512, the basket 505 may not interfere with the panel assembly 10.

Referring to FIG. 32, a portion of the basket 505 may be disposed on an area defined by the door liner 60a. That is, a front surface 505a of the basket 505 may be disposed adjacent to a rear surface of the panel assembly 10 (for example, the second panel 13).

Thus, the front surface 505a of the basket 505 may be disposed closer to the second panel 13 than one point of the door liner 60a.

The front surface 505a of the basket 505 may be spaced apart from the second panel 13 to prevent the front surface 505a of the basket 505 and the second panel 13 from being in contact with each other. A spaced distance D7 between the front surface 505a of the basket 505 and the second panel 13 may be greater than a thickness of the second panel 13.

The spaced space between the front surface 505a of the basket 505 and the second panel 13 may provide a path for light irradiated from the door lighting unit 402.

The front surface 505a of the basket 505 may be disposed in a space defined by an insulation material 80 provided in the insulation space P.

To prevent the basket 505 and the door liner 60a from interfering with each other during the rotation of the second door 520, both side surfaces 505b of the basket 505 may be spaced apart from the intermediate member 63a of the door liner 60a. The intermediate member 63a may define a space in which the basket 505 is disposed. When the intermediate member 63a is integrated with the door liner 60a, the intermediate member 63a is referred to as an inner member defining a space in the door liner 60a in which the basket 505 is disposed (or it may also be referred to as the bent portion described above).

A horizontal distance from a rotation center of the second door 520 to one surface of both side surfaces 505b of the basket 505 may be greater than a maximum horizontal distance from the rotation center of the second door to the intermediate member (or the inner member) of the door liner 60a to prevent the basket 505 and the door liner 60a from interfering with each other during the rotation of the second door 520.

A spaced distance D8 between each of both side surfaces 505b of the basket 505 and the intermediate member 63a is greater than a spaced distance D7 between the front surface 505a of the basket 505 and the second panel 13. The spaced distance D8 between each of both side surfaces 505b of the basket 505 and the intermediate member 63a may be determined based on a rotation trajectory of the second door 520 and the spaced distance D7 between the front surface 505a of the basket 505 and the second panel 13.

The spaced space between both side surfaces 505b of the basket 505 and the intermediate member 63a may provide a path for light irradiated from the door lighting unit 402.

In FIGS. 30 to 32, the relationship between the panel assembly 10 and the door lighting unit 402 in the second door 520 has been described, but the related information may be applied equally even when the refrigerator includes one door. For example, the door lighting unit 402 may be disposed in the frame assembly 90 of the refrigerating compartment door or the freezing compartment door, and a size of each of the spacers may be determined according to the arrangement relationship between the door lighting unit 420 and the spacers.

A storage space lighting unit 401 may be provided in the cabinet 501. The position of the storage space lighting unit 401 is not limited. For example, the storage space lighting unit 401 may be disposed at a front end (a position adjacent to the door) of the cabinet 501 or on a rear wall defining the storage space.

In this case, even when the door lighting unit 402 does not exist, if the storage space lighting unit 401 is turned on, the inside of the storage space may be visualized by the light of the storage space lighting unit 401.

The storage space lighting unit 402 may be disposed on an upper wall of the cabinet 501, a lower wall, or at least one of both sidewalls.

When the storage space lighting unit 402 is disposed on the wall defining the storage space, an amount of light or intensity of light reaching the other spacers disposed at the center of the panel assembly 10 may be greater than an amount or intensity of light reaching the spacer disposed at the outer side of the panel assembly 10.

In this case, among the plurality of spacers, a diameter (or size) of the spacer disposed at the center of the panel assembly 10 may be less than a diameter (or size) of the spacer disposed on the outer side of the panel assembly.

Figure 34:
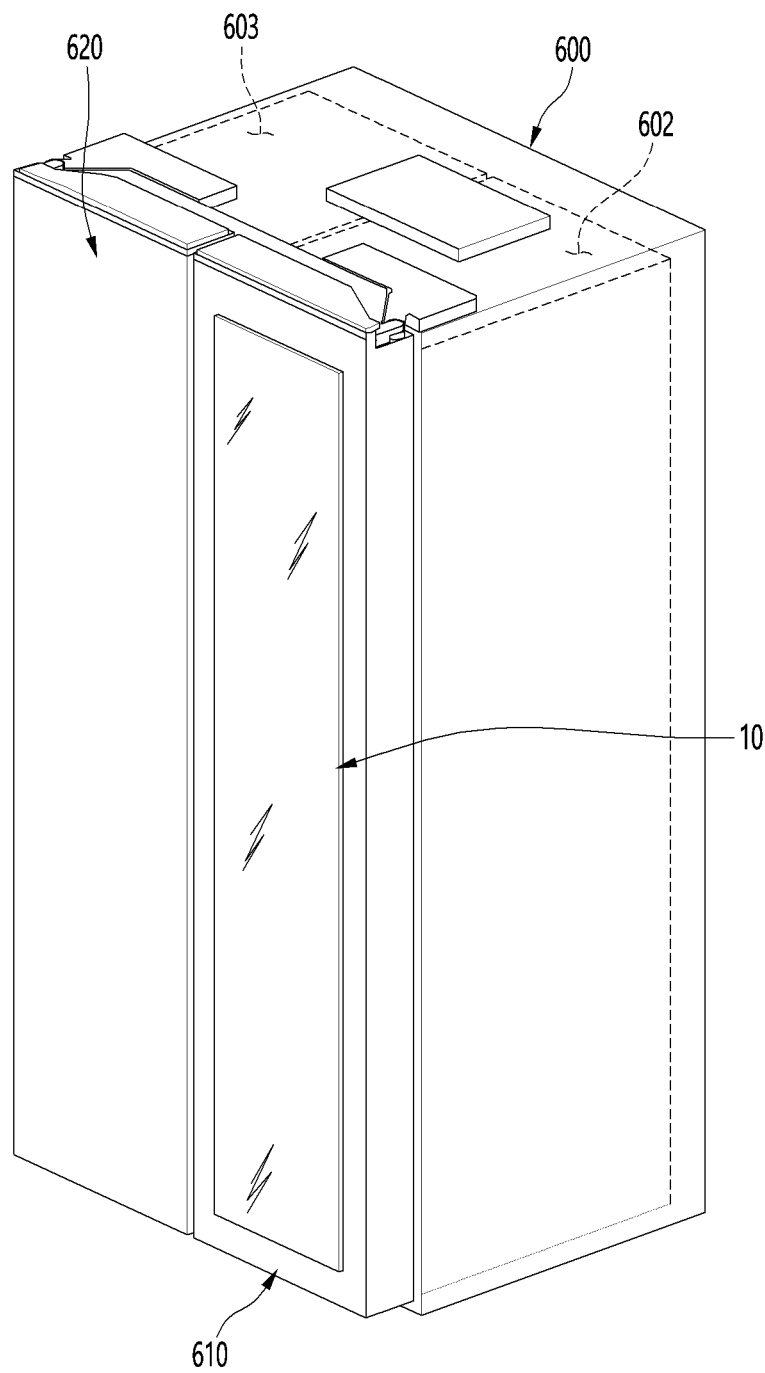
FIG. 34 is a view illustrating another example in which the panel assembly is applied to the refrigerator according to the present invention.

FIG. 34 is a view illustrating another example in which the panel assembly is applied to the refrigerator according to the present invention.

FIG. 34 illustrates a side-by-side type refrigerator as an example.

Referring to FIG. 34, in the refrigerator 600 of this embodiment, a freezing compartment 603 and a refrigerating compartment 602 may be disposed at left and right sides. The freezing compartment 603 may be opened and closed by a freezing compartment door 620, and the refrigerating compartment 602 may be opened and closed by a refrigerating compartment door 610.

The refrigerating compartment door 610 may include the panel assembly 10 described above, and a structure of the refrigerating compartment door 610 may be the same as or similar to the structure of the door 30 described in FIGS. 9 to 11.

FIG. 34 illustrates that the refrigerating compartment door 610 includes the panel assembly 10 according to the first embodiment, but it should be noted that the panel assemblies of the second to fourth embodiments described above may be applied to the refrigerating compartment door 610 in the same manner.

Also, it is noted that the configuration and functions for transmitting light through the panel assembly by turning on the lighting unit by sensing the knock input described above may be applied to this refrigerator in the same manner.

Figure 35:
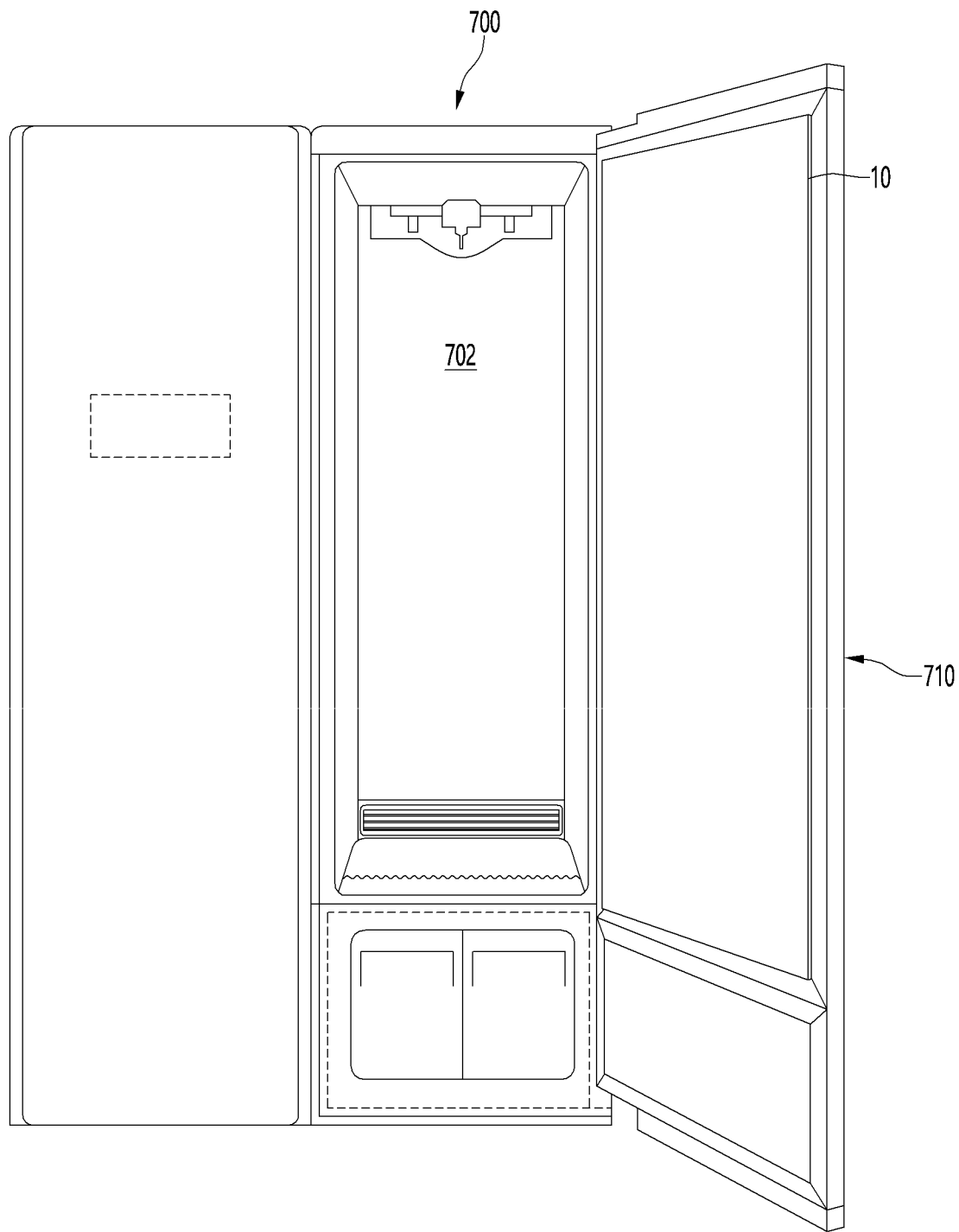
FIG. 35 is a view illustrating a state in which the panel assembly is applied to a cloth processor that is an example of a home appliance.

FIG. 35 is a view illustrating a state in which the panel assembly is applied to a cloth processor that is an example of a home appliance.

Referring to FIG. 35, in the case of a cloth processor, an inner space 702 for processing such as sterilization and storage of clothes is provided, and the inner space 702 may be opened and closed by a door 710. The door 710 may include the panel assembly 10 described above.

A structure of the door 710 according to this embodiment may be the same as or similar to the structure of the door described above. For example, the door of the home appliance may include a frame including an opening, and a panel assembly connected to the frame to cover the opening. An insulation material may be or may not be provided inside the frame.

FIG. 35 illustrates that the door 710 includes the panel assembly 10 according to the first embodiment, but it should be noted that the panel assemblies of the second to fourth embodiments described above may be applied to the door 710 in the same manner.

Also, it is noted that the configuration and functions for transmitting light through the panel assembly by turning on the lighting unit by sensing the knock input described above may be applied to this cloth processor in the same manner.

Also, although not presented in the this specification, if the home appliance includes the inner space and a door including the inner space and a door that opens and closes the inner space, the panel assembly of the present invention may be provided on the door, the configuration and functions for transmitting light through the panel assembly by turning on the lighting unit due to the sensing of a knock input may be applied in the same manner.

What is claimed is:

1. An appliance comprising:
   a cabinet having an inner space;
   a lighting unit disposed within the inner space; and
   a door configured to open and close at least a portion of the inner space, the door comprising (i) a frame having an opening and (ii) a panel assembly that covers the opening,
   wherein the panel assembly comprises:
      a first panel that is made of tinted glass and that defines a front surface of the door,
      a second panel spaced apart from the first panel and made of a glass material,
      a plurality of spacers disposed between the first panel and the second panel and configured to maintain a gap between the first panel and the second panel to be in a range of 0.1 mm to 1 mm,
      a sealing member disposed between the first panel and the second panel and configured to seal a space defined between the first panel and the second panel,
      an exhaust hole defined in the second panel and configured to allow air to be exhausted from the space defined between the first panel and the second panel,
      a getter that overlaps with the exhaust hole and that is configured to absorb moisture in the space defined between the first panel and the second panel, and
      a cover member inserted into the exhaust hole,
   wherein the first panel comprises:
      a first area positioned forward of the plurality of spacers and configured to transmit light through the tinted glass, and
      a second area that surrounds the first area and that is configured to block light transmission through the tinted glass, and
   wherein the second area is positioned forward of the sealing member and the exhaust hole and is defined by a printed layer on a rear surface of the first panel.

2. The appliance of claim 1, wherein the getter is inserted into the exhaust hole.

3. The appliance of claim 1, wherein the door further comprises an insulation material provided in a space defined by the frame and the panel assembly, and
wherein the insulation material is configured to surround the sealing member.

4. The appliance of claim 3, wherein the insulation material is directly in contact with a rear surface of the second panel.

5. The appliance of claim 3, wherein the insulation material is configured to surround the cover member.

6. The appliance of claim 1, further comprising a heater that is provided at a rear side of the first panel and that faces the printed layer.

7. The appliance of claim 1, wherein a portion of the plurality of spacers faces the printed layer.

8. An appliance comprising:
a cabinet having an inner space;
a lighting unit disposed within the inner space; and
a door configured to open and close at least a portion of the inner space, the door comprising (i) a frame having an opening and (ii) a panel assembly that covers the opening,
wherein the panel assembly comprises:
a first panel made of a glass material,
a second panel spaced apart from the first panel and made of a glass material,
a third panel made of tinted glass, the third panel defining a front surface of the door,
a plurality of spacers disposed between the first panel and the second panel and configured to maintain a gap between the first panel and the second panel,
a sealing member disposed between the first panel and the second panel and configured to seal a space defined between the first panel and the second panel,
an exhaust hole positioned at the second panel and configured to allow air to be exhausted from the space,
a cover member inserted into the exhaust hole, and
a getter that overlaps with the exhaust hole and that is configured to absorb moisture in the space defined between the first panel and the second panel,
wherein the third panel comprises:
a first area positioned forward of the plurality of spacers and configured to transmit light through the tinted glass, and
a second area that surrounds the first area and that is configured to block light transmission through the tinted glass, and
wherein the second area is positioned forward of the sealing member and the exhaust hole and has a printed layer disposed on a rear surface of the third panel.

9. The appliance of claim 8, wherein the getter is provided in the first panel.

10. The appliance of claim 8, wherein the gap is in a range of 0.1 mm to 1 mm.

11. The appliance of claim 8, wherein the door further comprises an insulation material provided in a space defined by the frame and the panel assembly, and
wherein the insulation material is configured to surround the sealing member.

12. The appliance of claim 11, wherein the insulation material is directly in contact with a rear surface of the second panel.

13. The appliance of claim 11, wherein the insulation material is configured to surround the cover member.

14. A refrigerator comprising:
a cabinet having an inner space; and
a door configured to open and close at least a portion of the inner space, the door comprising (i) a frame having an opening and (ii) a panel assembly that covers the opening,
wherein the panel assembly comprises:
a first panel made of a glass material, the first panel defining a front surface of the door,
a second panel spaced apart from the first panel and made of a glass material,
wherein a size of the first panel is greater than a size of the second panel,
a heater mounted on a rear surface of the first panel,
a sealing member disposed between the first panel and the second panel and configured to seal a space between the first panel and the second panel,
an exhaust hole defined in at least one of the first panel or the second panel and configured to exhaust air from the space between the first panel and the second panel to define a vacuum insulation space,
a cover member configured to cover the exhaust hole, and
an insulation material provided in an insulation space defined by the frame and panel assembly,
wherein the insulation material overlaps with the second panel along a left-right direction, and
wherein an overlapping length between the insulation material and the second panel along the left-right direction is greater than a thickness of the panel assembly in a front-rear direction.

15. The refrigerator of claim 14, wherein the first panel comprises an extended portion that extends outside of the second panel, and
wherein the heater is mounted on the extended portion.

16. The refrigerator of claim 14, wherein the panel assembly further comprises a getter that overlaps with the exhaust hole and that is configured to absorb moisture in the space defined between the first panel and the second panel.

17. The refrigerator of claim 14, wherein the panel assembly further comprises a plurality of spacers disposed between the first panel and the second panel and configured to maintain a gap between the first panel and the second panel to be in a range of 0.1 mm to 1 mm.

18. The refrigerator of claim 14, wherein the insulation material is configured to surround the sealing member and the cover member.

19. The refrigerator of claim 18, wherein the insulation material is directly in contact with a rear surface of the second panel.

* * * * *